(12) United States Patent
Suk et al.

(10) Patent No.: US 10,990,207 B2
(45) Date of Patent: Apr. 27, 2021

(54) ELECTRONIC DEVICE AND SCREEN PROVISION METHOD OF ELECTRONIC DEVICE

(71) Applicant: Samsung Electronics Co., Ltd., Gyeonggi-do (KR)

(72) Inventors: Hyejung Suk, Seoul (KR); Haedong Lee, Daegu (KR); Hyojin Son, Daegu (KR); Jeongseob Kim, Daegu (KR); Yeunwook Lim, Daegu (KR); Yonggil Han, Gyeongsangbuk-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/349,887

(22) PCT Filed: Oct. 20, 2017

(86) PCT No.: PCT/KR2017/011633
§ 371 (c)(1),
(2) Date: May 14, 2019

(87) PCT Pub. No.: WO2018/093053
PCT Pub. Date: May 24, 2018

(65) Prior Publication Data
US 2020/0081570 A1 Mar. 12, 2020

(30) Foreign Application Priority Data
Nov. 15, 2016 (KR) .................. 10-2016-0151832

(51) Int. Cl.
*G06F 3/041* (2006.01)
*G06F 3/0488* (2013.01)
(Continued)

(52) U.S. Cl.
CPC ........ *G06F 3/0412* (2013.01); *G06F 3/04886* (2013.01); *G06F 21/32* (2013.01); *G06K 9/0002* (2013.01)

(58) Field of Classification Search
CPC .... G06F 3/0412; G06F 3/04886; G06F 21/32; G06K 9/0002
See application file for complete search history.

(56) References Cited

U.S. PATENT DOCUMENTS

2005/0169503 A1* 8/2005 Howell .................. G06F 3/011
382/115
2014/0302818 A1* 10/2014 Fyke ...................... G06F 21/32
455/411
(Continued)

FOREIGN PATENT DOCUMENTS

EP 2 871 872 5/2015
EP 3 054 399 8/2016
(Continued)

OTHER PUBLICATIONS

PCT/ISA/210 Search Report issued on PCT/KR2017/011633, pp. 7.
(Continued)

*Primary Examiner* — Lixi C Simpson
(74) *Attorney, Agent, or Firm* — The Farrell Law Firm, P.C.

(57) ABSTRACT

An electronic device according to various embodiments of the present invention comprises a fingerprint sensor, a display and a processor, wherein the processor may be configured to: execute an application comprising a plurality of resources corresponding to a plurality of images to be displayed on the display with respect to the fingerprint sensor; determine a resource among the plurality of resources which corresponds to the fingerprint sensor, on the basis of an attribute of the fingerprint sensor; and display one
(Continued)

of the images which corresponds to the determined resource, on the display with respect to the fingerprint sensor.

16 Claims, 28 Drawing Sheets

(51) Int. Cl.
*G06F 21/32* (2013.01)
*G06K 9/00* (2006.01)

(56) References Cited

U.S. PATENT DOCUMENTS

| | | | |
|---|---|---|---|
| 2015/0133084 A1 | 5/2015 | Baek et al. | |
| 2015/0135108 A1 | 5/2015 | Pope et al. | |
| 2015/0169163 A1 | 6/2015 | Lee et al. | |
| 2015/0220767 A1* | 8/2015 | Yoon | G06K 9/00006 382/124 |
| 2015/0277652 A1 | 10/2015 | Kim | |
| 2015/0363632 A1 | 12/2015 | Ahn et al. | |
| 2015/0371073 A1* | 12/2015 | Cho | G06F 3/04886 382/124 |
| 2016/0042166 A1* | 2/2016 | Kang | G06F 21/32 726/7 |
| 2016/0132176 A1 | 5/2016 | Bae et al. | |
| 2016/0246396 A1 | 8/2016 | Dickinson et al. | |
| 2016/0253538 A1 | 9/2016 | Lu et al. | |
| 2016/0321442 A1 | 11/2016 | Song et al. | |
| 2017/0024597 A1 | 1/2017 | Cho et al. | |
| 2018/0113558 A1* | 4/2018 | Cho | G06K 9/0002 |
| 2018/0335880 A1* | 11/2018 | Seol | G06F 3/0488 |
| 2020/0065470 A1* | 2/2020 | Van Os | H04L 63/0861 |

FOREIGN PATENT DOCUMENTS

| | | |
|---|---|---|
| EP | 3 089 021 | 11/2016 |
| KR | 1020150045271 | 4/2015 |
| KR | 1020150144666 | 12/2015 |
| KR | 1020150146236 | 12/2015 |
| KR | 1020160057324 | 5/2016 |
| KR | 1020160096390 | 8/2016 |
| WO | WO 2013/173838 | 11/2013 |
| WO | WO 2015/056844 | 4/2015 |
| WO | WO 2016/133602 | 8/2016 |

OTHER PUBLICATIONS

PCT/ISA/237 Written Opinion issued on PCT/KR2017/011633, pp. 7.

European Search Report dated Sep. 25, 2019 issued in counterpart application No. 17871179.2-1231, 9 pages.

\* cited by examiner

ELECTRONIC DEVICE AND SCREEN PROVISION METHOD OF ELECTRONIC DEVICE

PRIORITY

This application is a National Phase Entry of PCT International Application No. PCT/KR2017/011633 which was filed on Oct. 20, 2017, and claims priority to Korean Patent Application No. 10-2016-0151832, which was filed on Nov. 15, 2016, the content of each of which is incorporated herein by reference.

TECHNICAL FIELD

Embodiments relate to an electronic device, for example, an electronic device including a fingerprint sensor.

BACKGROUND ART

With the development of mobile communication technology and processor technology, electronic devices (e.g., portable terminal devices) can perform a great variety of functions in addition to a traditional telephony function. For example, various applications such as an Internet browser, a game, and a calculator have been developed and used in electronic devices. As functions available in electronic devices have become more diverse, the security of information stored in electronic devices has become more important. In order to meet such security needs, authentication techniques based on user's biometric information are being developed.

Authentication techniques based on biometric information may acquire biometric information such as a fingerprint, an iris, a voice, a face, and a blood vessel from a user, compare the acquired biometric information with previously registered biometric information, and thereby determine whether or not the user is an authenticated user. Among authentication techniques based on biometric information, a fingerprint recognition technique is one of commercially available techniques for various reasons such as convenience, security, and economy. For user authentication using fingerprint recognition, an electronic device may store in advance fingerprint information extracted from a user's fingerprint image in a memory. Then, the electronic device may newly acquire a fingerprint image from a user who requests authentication, compare it with the stored fingerprint image, and authenticate the user as a registered user when both fingerprint images coincide with each other.

DISCLOSURE OF INVENTION

Technical Problem

As there are various applications using a fingerprint recognition function, it is necessary to appropriately provide a user interface related to a fingerprint sensor according to attributes of an electronic device. Accordingly, various embodiments of the disclosure provide an electronic device and method for appropriately providing a user interface related to a fingerprint sensor with respect to various applications to suit attributes of the electronic device.

Solution to Problem

An electronic device according to various embodiments of the disclosure may include a fingerprint sensor, a display, and a processor. The processor may be configured to execute an application including a plurality of resources corresponding to a plurality of images to be displayed through the display in association with the fingerprint sensor, to determine a resource corresponding to the fingerprint sensor among the plurality of resources, based on an attribute of the fingerprint sensor, and to display an image corresponding to the determined resource though the display in association with the fingerprint sensor.

An electronic device according to various embodiments of the disclosure may include a fingerprint sensor, a display, and a processor. The processor may be configured to execute an application, to acquire screen resource information associated with the application, to generate a user interface associated with the fingerprint sensor, based on the screen resource information, and to display the user interface around the fingerprint sensor through the display.

A method of an electronic device according to various embodiments of the disclosure may include, when the electronic device includes a touch sensor, a fingerprint sensor, and a display having a display region in which a fingerprint sensing region is formed, operations of executing an application including a plurality of resources corresponding to a plurality of images to be displayed through the display in association with the fingerprint sensor, determining a resource corresponding to the fingerprint sensor among the plurality of resources, based on an attribute of the fingerprint sensor, and displaying an image corresponding to the determined resource though the display in association with the fingerprint sensor.

Advantageous Effects of Invention

According to various embodiments of the disclosure, an electronic device can appropriately provide a user interface related to a fingerprint sensor with respect to various applications to suit attributes of the electronic device, and also provide a screen provision method.

MODE FOR THE INVENTION

Figure 1:
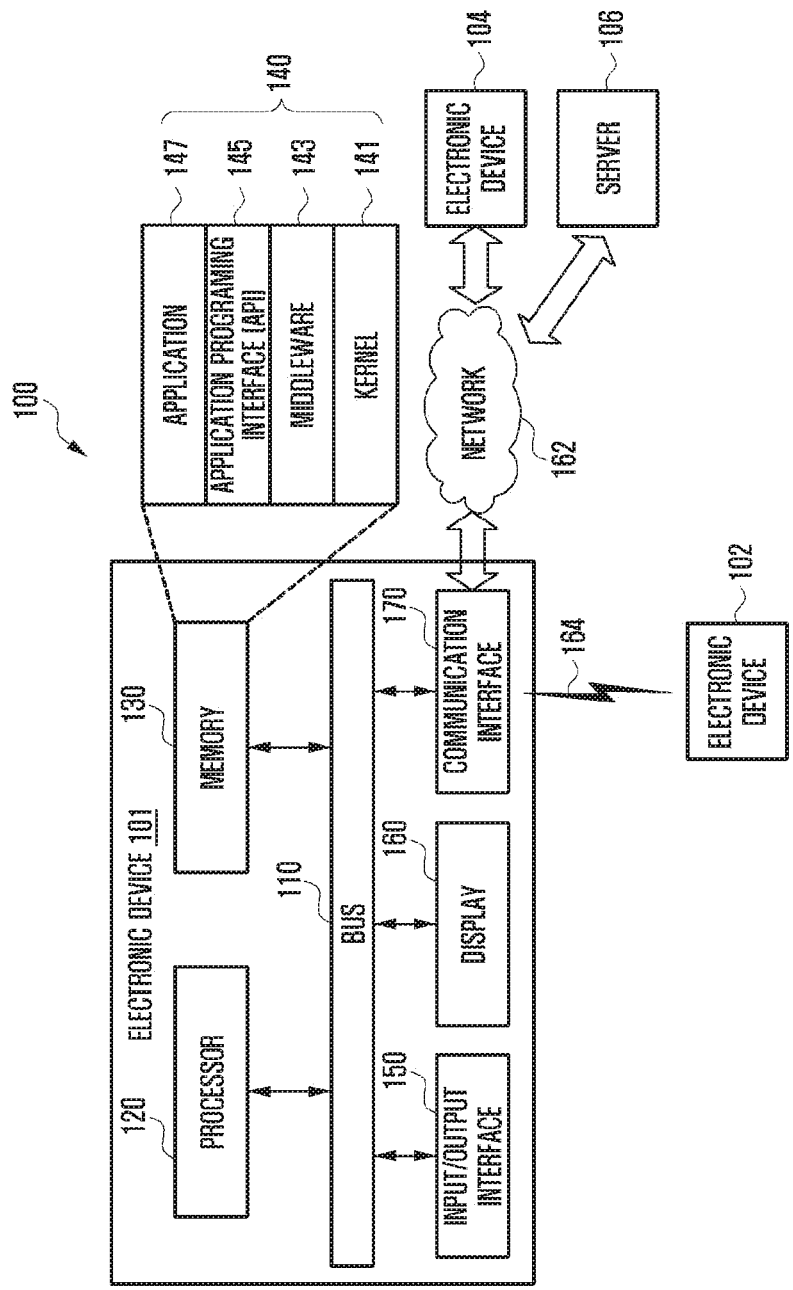
FIG. 1 illustrates an electronic device in a network environment according to various embodiments.

Hereinafter, various embodiments of the present disclosure are described in detail with reference to accompanying drawings. The embodiments and terms used herein are not intended to limit the technology disclosed in specific forms and should be understood to include various modifications, equivalents, and/or alternatives to corresponding embodiments. In the drawings, similar reference numbers are used to indicate similar constituent elements. As used herein, singular forms are intended to include the plural forms as well, unless the context clearly indicates otherwise. In the present disclosure, the expression "A or B" or "at least one of A and/or B" is intended to include any possible combination of enumerated items. In the present disclosure, expressions such as "1st" or "first", "2nd" or "second", etc. may modify various components regardless of the order and/or the importance but do not limit corresponding components. When it is mentioned that a (first) component is "connected" to or "accessed" by another (second) component, it may be understood that the component is directly connected to or accessed by the other component or that still other (third) component is interposed between the two components.

In the present disclosure, the expression "configured to ~" may be interchangeably used with the expressions "suitable for ~", "having a capability of ~", "changed to ~", "made to ~", "capable of ~", and "designed for" in hardware or software. The expression "device configured to ~" may denote that the device is "capable of ~" with other devices or components. For example, a "processor configured to (or set to) perform A, B, and C" may mean a dedicated processor (e.g., an embedded processor) for performing a corresponding operation or a general-purpose processor (e.g., a central processing unit (CPU) or an application processor (AP)) which executes corresponding operations by executing one or more software programs which are stored in a memory device.

According to various embodiments of the present disclosure, an electronic device may include at least one of a smart phone, a tablet Personal Computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, and a wearable device. The wearable device may include at least one of an appcessory type device (e.g. a watch, a ring, a bracelet, an anklet, a necklace, glasses, contact lens, and head-mounted-device (HMD), a textile or clothes-integrated device (e.g., electronic clothes), a body-attached device (e.g., skin pad and tattoo), and a bio-implemented circuit. According to various embodiments, the electronic device may include at least one of television (TV), a digital video disk (DVD) player, an audio player, an air conditioner, a cleaner, an oven, a microwave oven, a washing machine, an air cleaner, a set-top box, a home automation control panel, a security control panel, a media box (for example, Samsung HomeSync™, Apple TV™, or Google TV™), game consoles (for example, Xbox™, PlayStation™), an electronic dictionary, an electronic key, a camcorder, and an electronic frame.

According to an alternative embodiment, the electronic device may include at least one of a medical device (such as portable medical measuring devices (including a glucometer, a heart rate monitor, a blood pressure monitor, and a body temperature thermometer), a magnetic resonance angiography (MRA) device, a magnetic resonance imaging (MRI) device, a computed tomography (CT) device, a camcorder, and a microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), security equipment, an automotive head unit, an industrial or household robot, a drone, an automatic teller machine (ATM), a point of sales (POS) terminal, and an Internet-of-things (IoT) device (such as electric bulb, sensor, sprinkler system, fire alarm system, temperature controller, street lamp, toaster, fitness equipment, hot water tank, heater, and boiler). According to an embodiment of the present disclosure, the electronic device may include at least one of furniture, a part of a building/structure, a part of a vehicle, an electronic board, an electronic signature receiving device, a projector, and a sensor (such as water, electricity, gas, and electric wave meters). According to various embodiments of the present disclosure, the electronic device may be flexible or a combination of at least two of the aforementioned devices. According to an embodiment of the present disclosure, the electronic device is not limited to the aforementioned devices. In the present disclosure, the term "user" may denote a person who uses the electronic device or a device (e.g., artificial intelligent electronic device) which uses the electronic device.

A description is made of the electronic device 101 in a network environment 100 with reference to FIG. 1. The electronic device 101 may include a bus 110, a processor 120, a memory 130, an input/output interface 150, a display 160, and a communication interface 170. In an embodiment, the electronic device 101 may be configured without at least one of the aforementioned components or with another component. The bus 110 may include a circuit for interconnecting components 110 to 170 such that the components communicate signal (e.g., control message and data). The processor 120 may include at least one of a central processing device, an application processor, and a communication processor (CP). The processor 120 may execute operation related to the control of and/or communication among the other components constituting the electronic device 101 and perform data processing.

The memory 130 may include a volatile and/or non-volatile memory. The memory 130 may store a command or data associated with at least one of the components of the electronic device 101. According to an embodiment, the memory 130 may store software and/or programs 140. The programs 140 may include a kernel 141, a middleware 143, an application programming interface (API) 145, and/or an application program (or "application") 147. At least part of the kernel 141, middleware, and API 145 may be referred to as operating system. The kernel 141 may control or manage system resources (e.g., bus 110, processor 120, and memory 130) for use in executing operations or functions implemented in other programming modules (e.g., middleware 143, API 145, and application program 147). Further, the kernel 141 can provide an interface through which the middleware 143, the API 145, and/or the application 147 can access an individual element of the electronic device 101 and then control and/or manage system resources.

The middleware 143 may relay the data communicated between the API 145 or the application program 147 and the kernel 141. The middleware 143 may process at least one task request received from the application program 147 according to priority. For example, the middleware 143 may assign a priority to at least one of the application programs 147 for use of the system resources (e.g., the bus 110, the processor 120, and the memory 130) of the electronic device 101 and process the at least one task request according to the assigned priority. The API 145 may include an interface for controlling the functions provided by the kernel 141 and the middle 143 and includes at least one interface or function (e.g., command) for file control, window control, and video control, and text control, by way of example. The input/output interface 150 may relay a command or data input by a user or via an external electronic device to other component(s) of the electronic device 101 and output a command or data received from other component(s) of the electronic device 101 to the user or the external electronic device.

Examples of the display 160 may include a liquid crystal display (LCD), a light emitting diodes display (LED), a organic LED (OLED) display, a micro electro mechanical systems (MEMS) display, and an electronic paper display. The display 160 may display various contents (e.g., text, image, video, icon, and symbol) to the user by way of example. The display 160 may include a touch screen that is capable of receiving a touch, gesture, proximity, or hovering input made with an electronic pen or part of the user's body by way of example. The communication interface 170 may set up a communication channel between the electronic device 101 and an external device (e.g., first external electronic device 102, second external electronic device 104, and server 106). For example, the communication interface 170 may connect to the network 162 through a wireless or wired communication channel to communicate with the external electronic device (e.g., second external electronic device 104 and server 106).

Examples of the wireless communication may include cellular communications using at least one of LTE, LTE Advanced (LTE-A), code division multiple access (CDMA), wideband CDMA (WCDMA), universal mobile telecommunications system (UMTS), Wireless Broadband (WiBro), and global system for mobile communications (GSM). According to an embodiment, examples of the wireless communication may include communications using at least one of wireless fidelity (Wi-Fi), Bluetooth, Bluetooth low energy (BLE), Zigbee, near field communication (NFC), magnetic secure transmission, radio frequency (RF), and body area network (BAN). According to an embodiment, examples of the wireless communication may include GNSS communication. Examples of the GNSS may include a global positioning system (GPS), a global navigation satellite system (Glonass), a Beidou navigation satellite system (hereinafter, referred to as "Beidou"), and Galileo (the European global satellite-based navigation system). In the following description, the terms "GPS" and "GNSS" are interchangeably used. Examples of the wired communication may include communications using at least one of universal serial bus (USB), high definition multimedia interface (HDMI), recommended standard 233 (RS-232), power line communication, and plain old telephone service (POTS). The network 162 may be a telecommunication network including a computer network (e.g., LAN and WAN), Internet, and telephony network, by way of example.

Each of the first and second external electronic device 102 and 104 may be identical to or different from the electronic device 101 in type. According to various embodiments, all or part of the operations being executed at the electronic device 101 may be executed at one or more other electronic devices (e.g., electronic devices 102 and 104 and server 106). According to an embodiment, if it is necessary for the electronic device 101 to execute a function or service automatically or in response to a request, the electronic device 101 may request to another device (e.g., electronic devices 102 and 104 and server 106) for executing at least part of related functions on its behalf or additionally. The other electronic device (e.g., electronic devices 102 and 104 and server 106) may execute the requested function or additional function and notify the electronic device 101 of the execution result. The electronic device 101 may provide the requested function or service with execution result in itself or after performing additional processing thereon. In order to accomplish this, it may be possible to use a cloud computing, a distributed computing, or a client-server computing technology.

Figure 2:
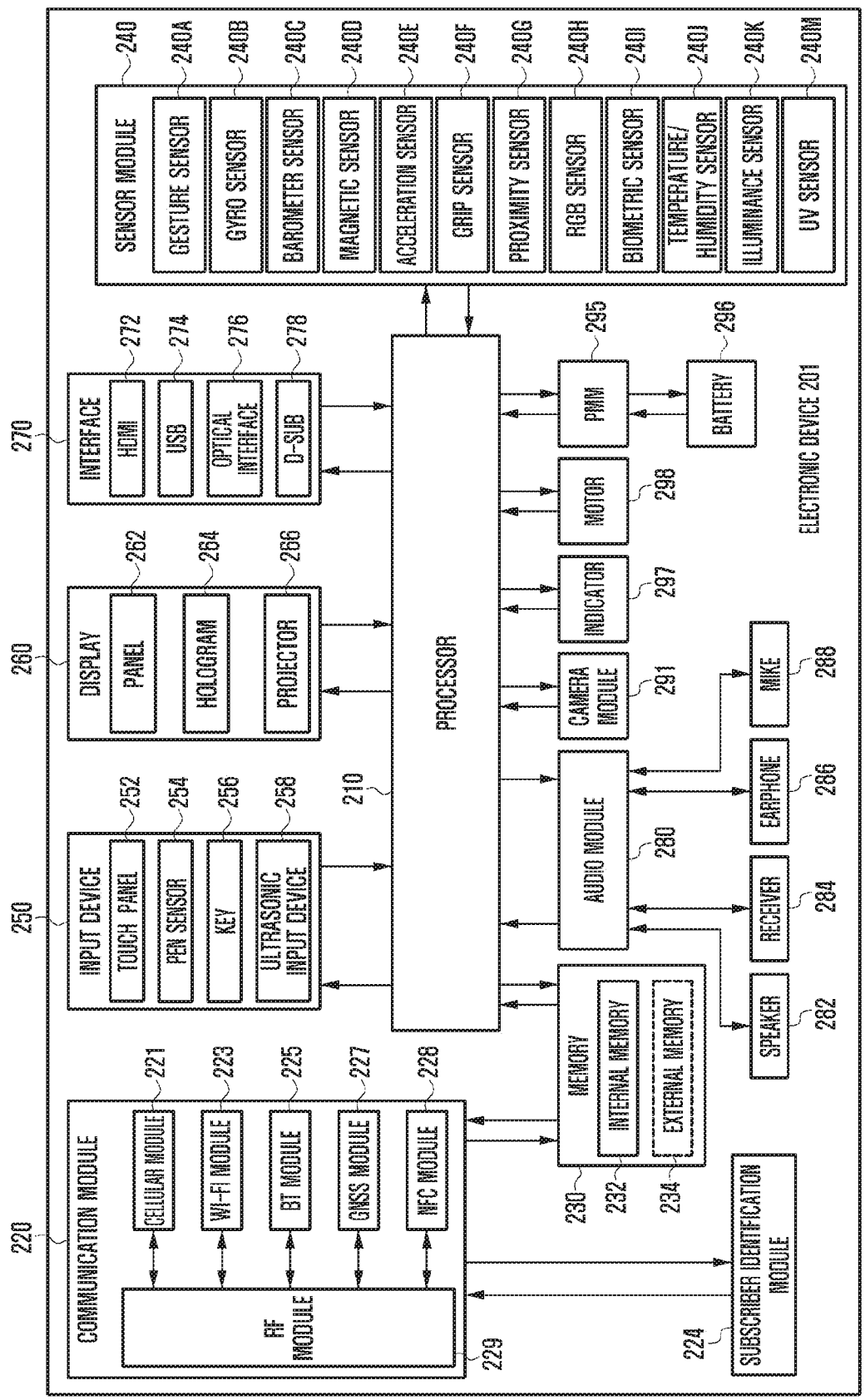
FIG. 2 is a block diagram illustrating an electronic device according to various embodiments.

FIG. 2 is a block diagram illustrating an electronic device 201 according to various embodiments. The electronic device 201 may include all or part of the electronic device 101 depicted in FIG. 1. The electronic device 201 may include at least one processor (e.g., AP 210), a communication module 220, a subscriber identity module (SIM) 224, a memory 230, a sensor module 240, an input device 250, a display 260, an interface 270, an audio module 280, a camera module 291, a power management module 295, a battery 296, an indicator 297, and a motor 298. The processor 210 may execute the operation system or an application program to control a plurality of hardware or software components connected to the processor 210 and perform various data processing and operations. The processor 210 may be implemented in the form of system on chip (SoC) by way of example. According to an embodiment, the processor 210 may also include a graphic processing unit (GPU) and/or an image signal processor. The processor 210 may include at least part (e.g., cellular module 221) of the components depicted in FIG. 2). The processor 210 may load the command or data received from at least one of other components (e.g., non-volatile memory) onto the volatile memory and store processed result data in the non-volatile memory.

The communication module 220 may have a configuration identical with or similar to that of the communication interface 170 by way of example. For example, the communication module 220 may include a cellular module 221, a Wi-Fi module 223, a Bluetooth module 225, a GNSS module 227, an NFC module 228, and an RF module 229. The cellular module 221 may provide a voice call service, a video call service, a text messaging service, and an Internet access service via a communication network, by way of example. According to an embodiment, the cellular module 221 may identity and authenticate the electronic device 201 and perform identification and authentication on the electronic device 201 in the communication network by means of the subscriber identity module (SIM) 224. According to an embodiment, the cellular module 221 may perform part of the functions of the processor 210. According to an embodiment, the cellular 221 may include a communication processor (CP). According to an embodiment, part of the cellular module 221, the Wi-Fi module 223, the Bluetooth module 225, the GNSS module 227, and the NFC module 228 (e.g., two or more) may be included in an integrated chip (IC) or an IC package. The RF module 229 may transmit/receive a communication signal (e.g., RF signal). The RF module 229 may include a transceiver, a power amplification module (PAM), a frequency filter, a low noise amplifier (LNA), and an antenna by way of example. According to an alternative embodiment, at least one of the cellular module 221, the Wi-Fi module 223, the Bluetooth module 225, the GNSS module 227, and the NFC module 228 may transmit/receive an RF signal via a separate RF module. The SIM 224 may include a card containing a subscriber identity module or an embedded SIM and contain unique identity information (e.g., integrated circuit card identifier (ICCID)) or subscriber information (e.g., international mobile subscriber identity (IMSI)).

The memory 230 (e.g., memory 130) may include an internal memory 232 and an external memory 234 by way of example. The internal memory 232 may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, and flash memory, a hard drive, and a solid state drive (SSD) by way of example. The external memory 234 may include flash drive such as compact flash (CF), secure digital (SD), Micro-SD, Mini-SD, extreme digital (xD), multimedia card (MMC), and memory stick. The external electronic device 234 may be functionally or physically connected with the electronic device 201 via various interfaces.

The sensor module 240 may measure physical quantities or detects an operation state of the electronic device 201 and convert the measured or detected information to an electrical signal. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. According to an embodiment, the electronic device 201 may further include another processor configured to control the sensor module 240 as part of or separated from the processor 210, and the another processor may control the sensor module 240 while the processor 210 is in a sleep state.

The input device 250 may include a touch panel 252, a (digital) pen sensor 254, a key 256, or an ultrasonic input device 258 by way of example. The touch panel 252 may use at least one of capacitive, resistive, infrared, or ultrasonic methods by way of example. The touch panel 252 may further include a control circuit. The touch panel 252 may further include a tactile layer to provide tactile response to a user. The (digital) pen sensor 254 may include a sheet for recognition as part of a touch panel or a separate sheet for recognition. The key 256 may include a physical button, an optical key, or a keypad, by way of example. The ultrasonic input device 258 may detect ultrasonic waves generated by an input tool through a microphone (e.g., the microphone 288) and ascertain data corresponding to the detected ultrasonic waves.

The display 260 (e.g., the display 160) may include a panel 262, a hologram device 264, a projector 266, and a control circuit for controlling the aforementioned components. The panel 262 may be implemented to be flexible, transparent, or wearable. The panel 262 may include a touch panel 252 and at least one module. According to an embodiment, the panel 262 may include a pressure sensor (or force sensor) that measures the intensity of touch pressure by a user. The pressure sensor may be implemented integrally with the touch panel 252, or may be implemented as at least one sensor separately from the touch panel 252. The hologram device 264 may display a stereoscopic image in the air using a light interference phenomenon. The projector 266 may display an image by projecting light on a screen. The screen may be placed inside or outside the electronic device 201 by way of example. The interface 270 may include an HDMI 272, a USB 274, an optical interface 276, or a D-subminiature (D-sub) 278 by way of example. The interface 270 may be included in the communication interface 170 shown in FIG. 1 by way of example. Additionally or alternatively, the interface 270 may include a mobile high-definition link (MHL) interface, an SD card/MMC interface, or an infrared data association (IrDA) standard interface.

The audio module 280 may convert sounds into electrical signals and convert electrical signals into sounds. At least some components of the audio module 280 may be included in the input/output interface 145 shown in FIG. 1 by way of example. The audio module 280 may process sound information inputted/outputted through a speaker 282, a receiver 284, an earphone 286, or a microphone 288. The camera module 291, as a device for capturing a still image and a video image, may include at least one image sensor (e.g., a front sensor or a rear sensor), a lens, an image signal processor (ISP), or a flash (e.g., an LED or a xenon lamp). The power management module 295 may manage the power of the electronic device 201. The power management module 295 may include a power management IC (PMIC), a charger IC, or a battery or fuel gauge. The PMIC may support wired and/or wireless charging methods. Examples of the wireless charging method may include a magnetic resonance method, a magnetic induction method, and an electromagnetic method, and the PMIC may further include supplementary circuit such as a coil loop, a resonant circuit, and a rectifier. The battery gauge may measure a remaining capacity of the battery 296, charging voltage and current, and temperature of the battery by way of example. The battery 296 may include a rechargeable battery and/or a solar battery by way of example.

The indicator 297 may display a specific state of the electronic device 201 or part thereof (e.g., the processor 210), such as a booting state, a message state, or a charging state. The motor 298 may convert electrical signals into mechanical vibration and may generate vibration or haptic effect. The electronic device 201 may include a mobile TV-support device (e.g., a GPU) for processing media data generated in compliance with the standards such as digital multimedia broadcasting (DMB), digital video broadcasting (DVB), and mediaFlo™. Each of the above-mentioned components may be configured with at least one component and the name of a corresponding component may vary according to the type of an electronic device. According to various embodiments, the electronic device (e.g., electronic device 201) may be configured without part of the aforementioned components or with additional components; part of the components may be combined into one entity capable of executing the same functions of the components before being combined.

Figure 3:
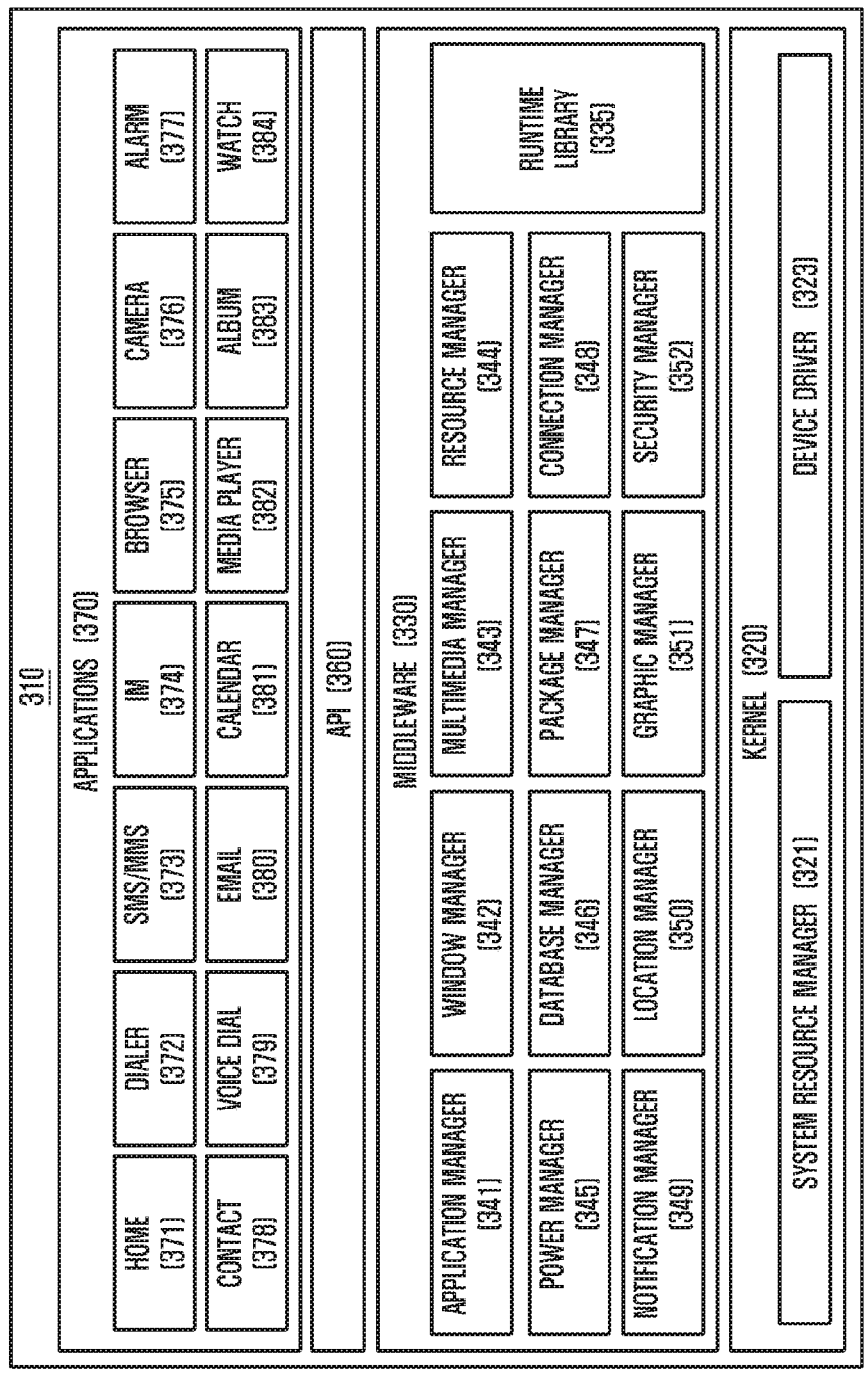
FIG. 3 is a block diagram illustrating a program module according to various embodiments.

FIG. 3 is a block diagram illustrating a program module according various embodiments. According to an embodiment, the program module 310 (e.g., program 140) may include an operating system for controlling the resources of the electronic device (e.g. electronic device 101) and various applications (e.g., application program 147) running on the operating system. The operating system may include Android™, iOS™, Windows™, Symbian™, Tizen™, and Bada™ for example. In reference to FIG. 3, the program module 310 may include a kennel 320 (e.g., kernel 141), a middleware 330 (e.g., middleware 143), an API 360 (e.g., API 145), and an application 370 (e.g., application 147). At least part of the program module 310 may be pre-loaded on the electronic device or downloaded from an external electronic device (e.g., electronic devices 102 and 104).

The kernel 320 may include a system resource manager 321 a device driver 323 by way of example. The system resource manager 321 may control, assign, or withdraw the system resources. According to an embodiment of the present disclosure, the system resource manager 321 may include a process manager, a memory manager, and a pile system manager. The device driver 323 may include a display driver, a camera driver, a Bluetooth driver, a common memory driver, a USB driver, a keypad driver, a Wi-Fi driver, an audio driver, and an inter-process communication (IPC) driver. The middleware 330 may provide a function for use by the applications in common and various functions for allowing the applications 370 to use the restricted system resources of the electronic device efficiently through the API 360. According to various embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352.

The runtime library 335 may include a library module for use by a compiler to add new functions with a programming language while the applications 370 are in running. The runtime library 335 may perform input/output management, memory management, and arithmetic function processing. The application manager 341 may manage the life cycles of the applications 370 by way of example. The window manager 342 may manage the GUI resources in use for screens. The multimedia manager 343 may check the formats of media files to encode or decode the media files using the codecs proper to the corresponding formats. The resource manager 344 may manage source codes of the applications 370 and memory space. The power manager 345 may manage battery capacity and power by way of example and provide power information necessary for the operation of the electronic device. According to an embodiment, the power manager 345 may interoperate with a basic input/output system (BIOS). The database manager 346 may generate, search, and modify a database for use by the applications 370 by way of example. The package manager 347 may manage installation and update of application distributed in the form of a package file.

The connectivity manager 348 may manage a wireless connection by way of example. The notification manager 349 may provide the user with events such as incoming message alarm, appointment alarm, and proximity alarm by way of example. The location manager 350 may manage location information of the electronic device. The graphic manager 351 may manage graphical effects and user interfaces to be provided to user by way of example. The security manager 352 may responsible for system security and user authentication by way of example. According to an embodiment, the middleware 330 may include a telephony manager for managing voice and video call functions of the electronic device and a middleware module capable of combining the functions of the aforementioned components. According to an embodiment, the middleware 330 may provide operation system type-specific modules. The middleware 330 may delete part of the existing components or add new components dynamically. The API 360 may provide operating system type-specific API program functions sets by way of example. For example, it may be possible to a set of APIs per platform for the case of the android or iOS and two or more sets of APIs per platform for the case of the Tizen.

The applications 370 may include a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384, a health care (e.g., workout amount and blood sugar), environmental information provision application (e.g., atmospheric pressure, humidity, and temperature). According to an embodiment, the application 370 may include an information exchange application for supporting information exchange between the electronic device and an external electronic device. The information exchange application may include a notification relay application for relaying specific information to the external electronic device and a device management application for managing the external electronic device by way of example. The notification relay application may relay notification information generated by another application of the electronic device to the external electronic device or provide the user with the notification information received from the external electronic device. The device management application may manage the functions of the external electronic device (e.g., turn-on/off of the external electronic device in itself (or a component thereof) and brightness (or resolution) adjustment of the display) communicating with the electronic device and install, uninstall, or update the applications operating on the external electronic device by way of example. According to an embodiment, the application 370 may include an application (e.g., healthcare application of a mobile medical device) designated according to the property of the external electronic device. According to an embodiment, the applications 370 may include an application received from the external electronic device. At least part of the application module 310 may be implemented (e.g., executed) in the form of software, firmware, hardware, or a combination of at least two thereof and include a module, a program, a routine, a command set, or a process for performing at least one function.

The term "module" used in this disclosure may mean a unit including, for example, one or a combination of hardware, software, and firmware. The term "module" may be interchangeably used with other terms, for example, such as unit, logic, logical block, component, or circuit. The "module" may be the minimum unit, or a part thereof, of an integrally constructed component. The "module" may be the minimum unit, or a part thereof, for performing one or more functions. The "module" may be implemented mechanically or electronically. For example, according to the present disclosure, the "module" may include at least one of an application-specific integrated circuit (ASIC) chip, field-programmable gate arrays (FPGAs), and a programmable-logic device, which are known or to be developed later and perform particular functions. According to various embodiments, at least a part of the device (e.g., modules or functions thereof) or the method (e.g., operations) may be implemented as instructions stored in a non-transitory computer-readable storage medium (e.g., the memory 130) in a programming module form. When the instructions are executed by a processor (e.g., 120), the processor may perform a function corresponding to the instructions. The non-transitory computer-readable recording medium may include magnetic media such as a hard disk, a floppy disk, and a magnetic tape, optical media such as a CD-ROM and a DVD, magneto-optical media such as a floptical disk, and hardware devices specially configured to store and perform a program instruction. In addition, the program instructions may include high class language codes, which can be executed in a computer by using an interpreter, as well as machine codes made by a compiler. A module or programming module according to various embodiments may include or exclude at least one of the above-discussed components or further include any other component. The operations performed by the module, programming module, or any other component according to various embodiments may be executed sequentially, in parallel, repeatedly, or by a heuristic method. Additionally, some operations may be executed in different orders or omitted, or any other operation may be added.

FIGS. 4A to 4D are diagrams illustrating an electronic device including a fingerprint sensor according to various embodiments.

Figure 4A:
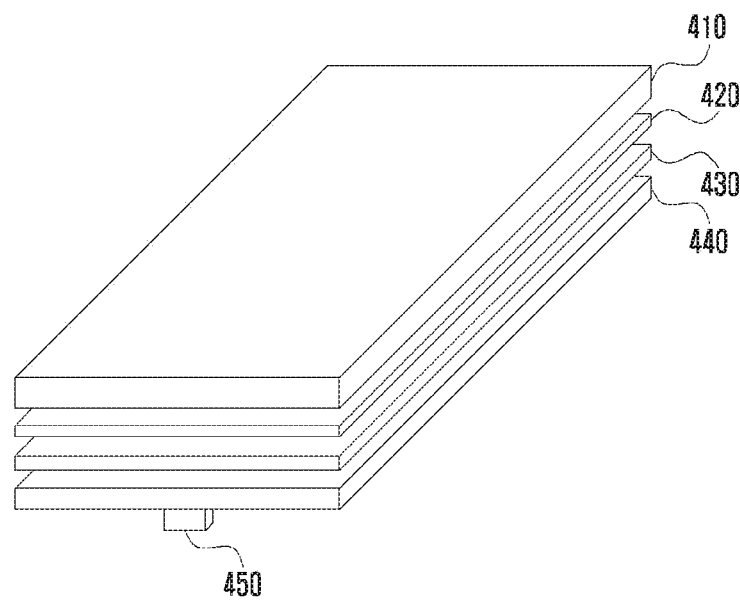
FIGS. 4A to 4D are diagrams illustrating an electronic device including a fingerprint sensor according to various embodiments.

FIG. 4A shows a layered structure of an electronic device 400 including a fingerprint sensor 450.

In FIG. 4A, an upper direction may be a front direction of the electronic device 400, and a lower direction may be a rear direction of the electronic device 400. Respective elements may be included in a housing (not shown).

A cover window 410 may be formed on a front surface of the housing. A transparent substrate may be formed of a transparent material to allow light to pass therethrough and may be formed to protect a display 440 from external impacts.

A touch sensor 420 and the display 440 may be formed under the cover window 410. The cover window 410 and the display 440 (or the touch sensor 420) may adhere to each other through an optically clear adhesive (OCA) 430. Although it is shown in FIG. 4A that touch sensor 420 is disposed above the display 440, this is not construed as a limitation. Alternatively, other various configurations such as an on-cell configuration or an in-cell configuration may be possible. The touch sensor 420 detects a touch of an object (e.g., a user's finger or a stylus) occurring on the cover window 410 through various touch detection schemes.

A fingerprint sensor 450 may be provided under the display unit 440 (or the touch sensor 420). The fingerprint sensor 450 is formed to obtain user's fingerprint information when a user's finger is positioned on the cover window 410. According to various embodiments, because the fingerprint sensor 450 is formed in one area of the rear surface of the display 440 under the touch sensor 420, the user is required to touch a finger within the display 440 and the touch sensor 420 for fingerprint recognition.

In the disclosure, the disposition type of the fingerprint sensor 450 is not limited. For example, there are an in/on-cover glass type in which a sensing unit or electrode for fingerprint sensing is disposed on a surface of a cover glass through printing or etching, an over-display type in which the sensing unit or electrode is disposed on a display panel, an under-display type in which the sensing unit or electrode is disposed under the display panel, and an in-display type in which the sensing unit or electrode is disposed inside pixels of the display panel or in a black matrix (BM) area between the pixels.

Additionally, in the disclosure, the type of the fingerprint sensor 450 is not limited. For example, the fingerprint sensor 450 may have an optical type of acquiring a fingerprint by capturing a fingerprint image of a finger surface through a photosensitive diode, a capacitive type of acquiring a fingerprint by using the principle that ridges of a fingerprint touched to an electrode are detected and non-touched grooves between the ridges are not detected, or an ultrasonic type of acquiring a fingerprint by generating ultrasonic waves at a piezoelectric device and using a path difference of the ultrasonic waves reflected on the ridges and those reflected on the grooves of the fingerprint.

Hereinafter, a case where an optical fingerprint sensor is disposed under the display 440 and the touch sensor 420 (under-display type) will be described as a representative, but the above-described various embodiments may be applied to the disclosure.

Figure 4B:
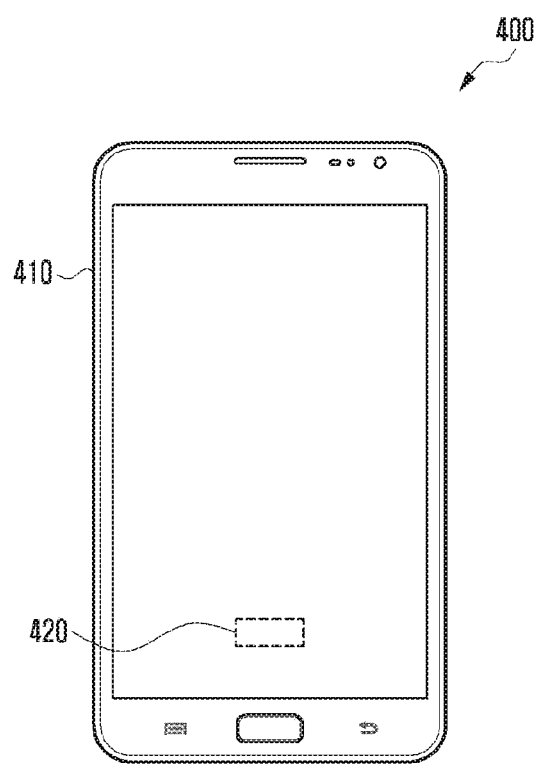
Figure 5:
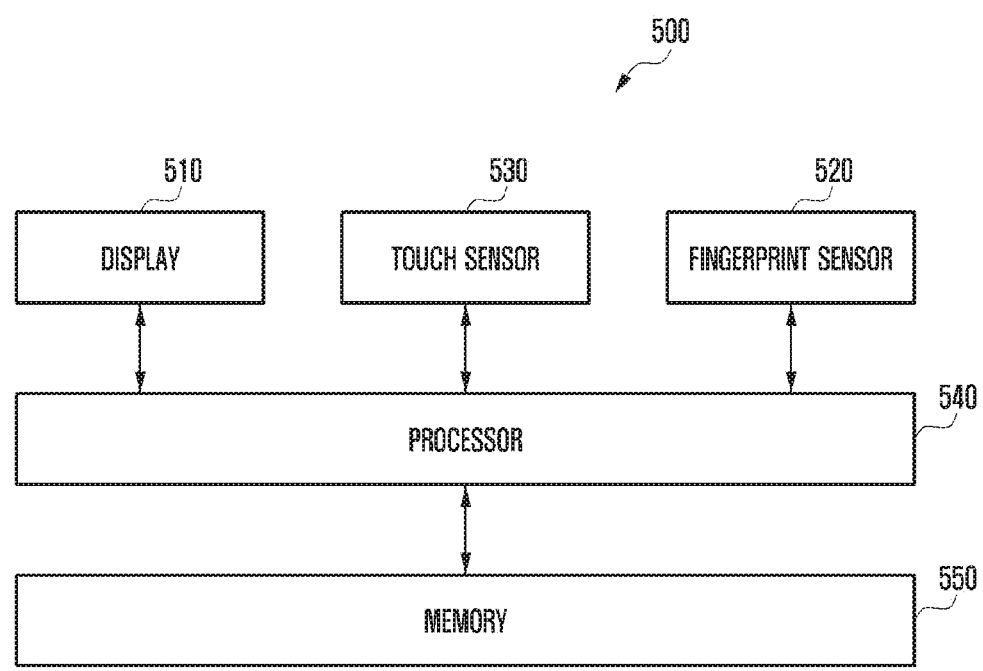
FIG. 5 is a block diagram illustrating an electronic device according to various embodiments.

FIG. 4B shows an example of a fingerprint sensor 470 located in a display panel 460 of an electronic device 500 of FIG. 5 according to various embodiments.

As shown, a touch sensor may be formed on a rear surface of the display 410 and thus not be visually perceived by the user. In this case, each of a cover window, an OCA, the touch sensor, and the display 410 includes a transparent or translucent region at least in part so that a certain amount of light can be transmitted therethrough, and the touch sensor is disposed under the transparent or translucent region to acquire a user's fingerprint image. According to an embodiment, the electronic device 500 may include a hole formed between pixels in at least a region of the display 460 so that a certain amount of light can be transmitted. According to an embodiment, a user interface associated with a fingerprint recognition function may be displayed in a fingerprint sensing region 420 of the display 410.

Figure 4C:
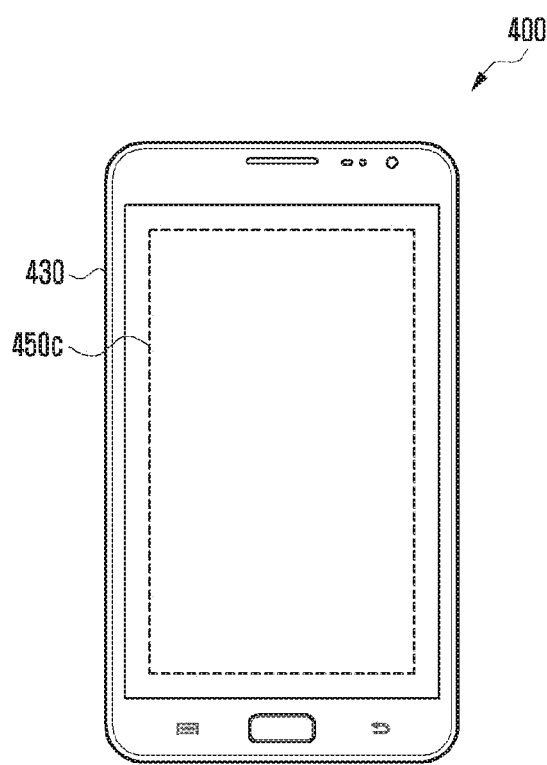
Figure 4D:
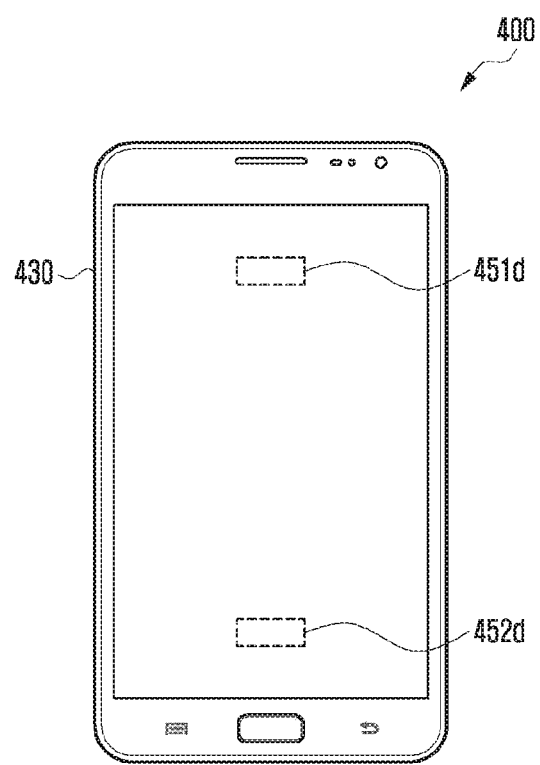

According to various embodiments, the size and/or location of the fingerprint sensing region are/is not limited. For example, the electronic device 400 may include a fingerprint sensing region 450c having a greater size as shown in FIG. 4C. In addition, according to another embodiment, the electronic device 400 may include two or more fingerprint sensors, and fingerprint sensing regions 451d and 452d corresponding to the respective fingerprint sensors may be formed in the display 410 as shown in FIG. 4D.

As such, the type, location, number, size, density, etc. of the fingerprint sensor equipped in the electronic device 400 may vary, and the electronic device 400 may store and manage information related to the fingerprint sensor. For example, types of the fingerprint sensor may be classified into an optical type, a capacitive type, an ultrasonic type, and the like according to a sensing scheme, and may be classified into a touch type, a sweep type, and the like according to an input scheme. The electronic device 400 may store information about the type of the fingerprint sensor equipped therein. The location of the fingerprint sensor may be defined as coordinate values (e.g., coordinate values on the x-axis and y-axis in the display), mechanical position values (e.g., front/rear/left/right/upper/lower, etc.), position values corresponding to a component (e.g., a home key, a menu key, a camera, etc.), and the like. The size may be defined as dimensions in length and width, and the density (or dpi) may be defined as low/middle/high/top levels and the like.

According to various embodiments, the electronic device 400 may include at least one fingerprint sensor on the rear surface of the display 410. As such, the fingerprint sensor integrated with the display 410 (i.e., display integrated fingerprint) may support various screens having different sizes from a small portable electronic device to a large TV and may be implemented with various sizes/densities. In addition, the fingerprint sensor may be disposed at various locations on the display 410 of the electronic device 400. Also, the fingerprint sensor may adopt various sensing schemes for acquiring a fingerprint. Therefore, in order to allow an application using a fingerprint recognition function to be executed in various kinds of electronic devices 400, it is necessary to provide a service at a correct position on the screen by realizing compatibility with various screen sizes and various types, locations and densities of fingerprint sensors. Also, in order to efficiently provide a typical user interface (UI)/user experience (UX) that considers only the size and direction of the display 410, a method of storing and managing resources corresponding to the types, locations, sizes, and densities of fingerprint sensors. Further, graphic processing for selecting an appropriate image set from resources, based on information about the type, location, size, and density of the fingerprint sensor equipped in the electronic device 400, and for drawing the image set in an appropriate layout may be needed.

Hereinafter, various embodiments capable of solving the above-mentioned needs will be described in detail.

FIG. 5 is a block diagram illustrating an electronic device according to various embodiments.

As shown, the electronic device 500 according to various embodiments includes a display 510, a touch sensor 530, a fingerprint sensor 520, a processor 540, and a memory 550. Even though some of the above elements are omitted or substituted, various embodiments of the disclosure may be implemented. In addition, the electronic device 500 may include at least some of configurations and/or functions of the electronic device 101 of FIG. 1 and/or the electronic device 201 of FIG. 2.

According to various embodiments, the display 510 displays an image and may be implemented as one of, but not limited to, a liquid crystal display (LCD), a light-emitting diode (LED) display, an organic light-emitting diode (OLED) display, a micro electro mechanical systems (MEMS) display, or an electronic paper display. The display 510 may include at least some of configurations and/or functions of the display 160 of FIG. 1 and/or the display 260 of FIG. 2.

According to various embodiments, the touch sensor 530 may detect a touch input occurring on a cover window formed on a front surface of the display 510. The touch sensor 530 may include at least some of configurations and/or functions of the touch panel 252 of FIG. 2.

According to various embodiments, the fingerprint sensor 520 may acquire user's fingerprint information. The fingerprint sensor 520 may be implemented with, but not limited to, an optical fingerprint sensor capable of acquiring a fingerprint image. The fingerprint information acquired by the fingerprint sensor 520 is stored as image information and may be used for authentication of the electronic device 500 through comparison with fingerprint information previously registered through various applications. The fingerprint sensor 520 may be formed at least in part under the touch sensor 530 and/or the display 510. Therefore, when a touch input using a user's finger occurs on a cover window of the display 510, the touch sensor 530 may acquire touch information, and the fingerprint sensor 520 may acquire fingerprint information at least simultaneously.

According to an embodiment, the fingerprint sensor 520 may be activated when the fingerprint recognition function is activated, for example, when a security-enabled application such as an unlocking action or a message application is executed. According to another embodiment, the fingerprint sensor 520 may be activated when the fingerprint recognition function is activated and then a touch input occurs on a region of the fingerprint sensor 520.

According to various embodiments, the processor 540 may be configured to perform operations or data processing related to control and/or communication of respective elements of the electronic device 500. The processor 540 may include at least some of configurations of the processor 120 of FIG. 1 and/or the application processor 210 of FIG. 2. The processor 540 may be electrically connected to internal elements of the electronic device 500 such as the display 510, the touch sensor 530, the fingerprint sensor 520, and the memory 550.

The memory 550 temporarily or permanently stores unrestricted digital data and may include at least one of the memory 130 of FIG. 1 and/or the memory 230 of FIG. 2. The memory 550 may include a volatile memory and a nonvolatile memory. The nonvolatile memory may include at least one of a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash), a hard drive, or a solid state drive (SSD). The volatile memory may include at least one of a dynamic RAM, a static RAM (SRAM), or a synchronous dynamic RAM (SDRAM).

The memory 550 may store various instructions that can be executed by the processor 540. Such instructions may include control instructions such as arithmetic and logical operations, data transfer, or input/output, which may be recognized by the processor 540, and may be defined on a framework stored in the memory 550. In addition, the memory 550 may store at least part of the program module 310 of FIG. 3.

According to various embodiments, the memory 550 may store various screen resources associated with the fingerprint sensor 520. For example, such screen resources may be stored on the framework.

According to various embodiments, there is no limitation on operating and data processing functions implemented by the processor 540 in the electronic device 500. Hereinafter, in various embodiments, operations of the processor 540 to acquire screen resource information related to an application and construct a user interface will be described in detail. Such operations of the processor 540 to be described below may be performed by loading the above-mentioned instructions stored in the memory 550.

According to various embodiments, the processor 540 may execute applications stored in the memory 550. For example, this application may have a fingerprint recognition function related to finance, security, personal contents, or the like, and may provide a user interface associated with the fingerprint recognition function.

According to an embodiment, the application may be a certain application produced by a third party other than the manufacturer of the electronic device 500, and may include a software development kit (SDK) that contains a header, a library, and other tools necessary for generating a user interface associated with the fingerprint recognition function.

According to various embodiments, the processor 540 may acquire screen resource information associated with the executed application. Herein, the screen resource information may include resources such as an image, an animation, a menu, and a layout, which constitute a user interface associated with the fingerprint recognition function. According to an embodiment, the screen resource information is stored on the framework, and the processor 540 may construct, in response to a call of the application, a user interface by using the screen resource information required by the application. According to another embodiment, the screen resource information is stored in the application, and the application may generate a user interface by referring to the attribute of the electronic device 500 and using suitable screen resource information.

According to an embodiment, the electronic device 500 may determine, based on the attribute of the application, whether to use a user interface provided by the processor 540 as the user interface associated with the fingerprint sensor 520. That is, when the attribute of the application indicates the use of a user interface provided by the processor 540, the electronic device 500 may determine that the processor 540 generates the user interface from the screen resource information in the framework as described above. Otherwise, when the application is determined to directly generate a user interface at the application level, the user interface may be generated using the screen resource information defined in the application. According to an embodiment, the memory 550 may store a white list of applications capable of generating a user interface by using the screen resource information associated with the fingerprint recognition function.

According to various embodiments, the application may store two or more kinds of screen resource information. When the application is executed through the processor 540, a resource corresponding to the fingerprint sensor 520 may be determined among a plurality of resources stored in the application, based on the attributes of the fingerprint sensor 520 included in the electronic device 500. For example, when the fingerprint sensor 520 has a first attribute, the processor 540 may select a first resource from among the plurality of resources, and when the fingerprint sensor 520 has a second attribute, the processor 540 may select a second resource from among the plurality of resources. Here, the first resource and the second resource may include two or more kinds of screen resource information.

According to an embodiment, the attributes of the fingerprint sensor 520 may include the type, size, density, etc. of the fingerprint sensor 520. For example, when the type of the fingerprint sensor 520 has the first attribute (e.g., an optical fingerprint sensor), the processor 540 may select the first resource (e.g., screen resource information suitable for using the optical fingerprint sensor), and when the type of the fingerprint sensor 520 has the second attribute (e.g., a capacitive fingerprint sensor), the processor 540 may select the second resource (e.g., screen resource information suitable for using the capacitive fingerprint sensor). In addition, when the size or density of the fingerprint sensor 520 has the first attribute (e.g., a fingerprint sensing region of 2 by 1 centimeters), the processor 540 may select the first resource (e.g., screen resource information of 2 by 1 centimeters), and when the size or density of the fingerprint sensor 520 has the second attribute (e.g., a fingerprint sensing region of 3 by 1.5 centimeters), the processor 540 may select the second resource (e.g., screen resource information of 3 by 1.5 centimeters). According to various embodiments, the processor 540 may be configured to generate a user interface associated with the fingerprint sensor 520, based on the screen resource information, and display the application and the user interface through the display 510. According to an embodiment, the processor 540 may be configured to generate the user interface by using, as the screen resource information, images, animations, menus, or layouts provided by the application. According to another embodiment, the processor 540 may generate the user interface by using images, animations, menus, or layouts stored on the operating system or framework.

According to one embodiment, the processor 540 may display a screen separated into a first area associated with the user interface and a second area associated with the application. That is, the processor 540 may enable an application screen generated by the application to be displayed in the second area of the display 510 and also, in a split form, enable the user interface related to the fingerprint recognition function and generated using the screen resource information by the processor 540 to be displayed in the first area separated from the second area.

According to another embodiment, the processor 540 may be configured to generate a first layer associated with the application and a second layer associated with the user interface, and to display the first and second layers to overlap with each other at least in part. That is, the processor 540 may generate the first layer for the application screen generated by the application, and generate the second layer for the user interface related to the fingerprint recognition function and generated using the screen resource information in the processor 540. Then, the processor 540 may display the second layer above the first layer in a pop-up form.

According to various embodiments, when displaying the user interface together with the application in the split form or the pop-up form, the processor 540 may display the user interface in an area designated in the application.

Figure 6A:
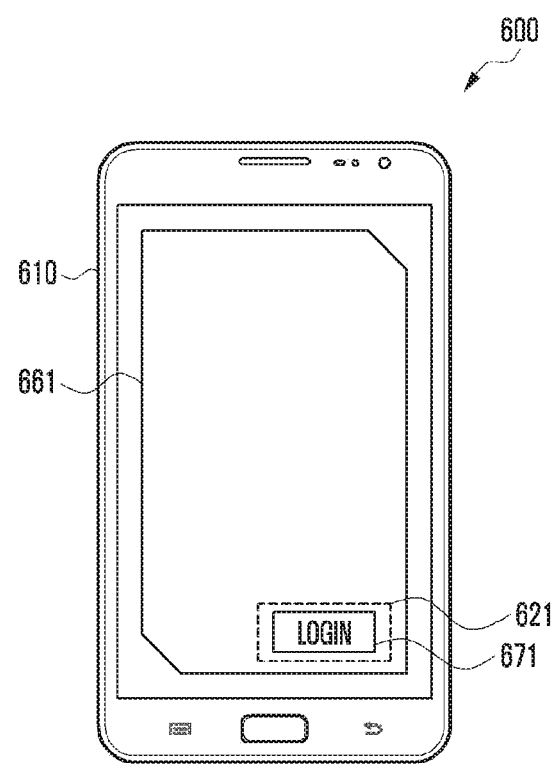
FIGS. 6A to 6C are diagrams illustrating examples of a user interface associated with a fingerprint sensor according to various embodiments.
Figure 6B:
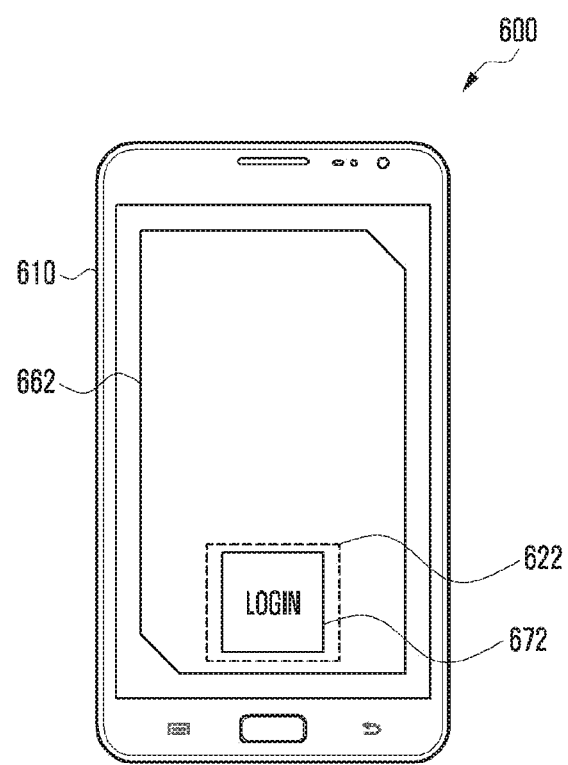
Figure 6C:
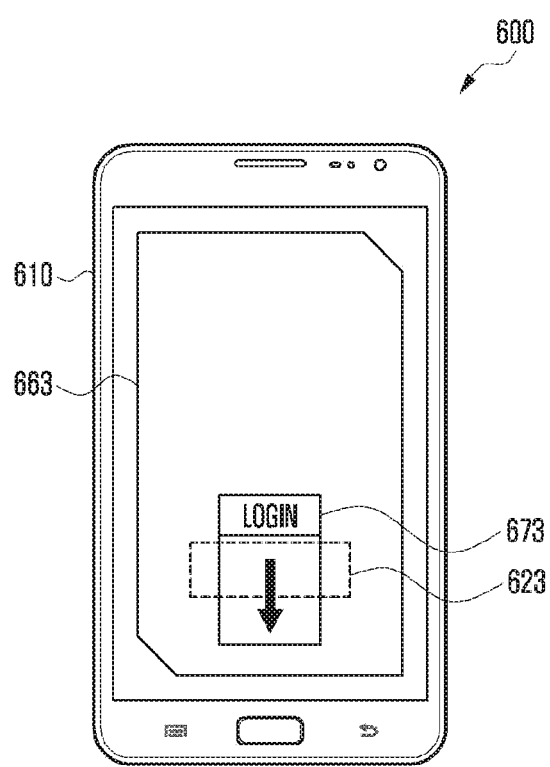

FIGS. 6A to 6C are diagrams illustrating examples of a user interface associated with a fingerprint sensor according to various embodiments.

According to various embodiments, an electronic device 600 includes at least one fingerprint sensor, which may be formed on a rear surface of a display 610 of the electronic device 600. Referring to FIG. 6A, the fingerprint sensor may be formed at a lower right portion under the display 610, and a fingerprint sensing region 621 corresponding to the fingerprint sensor may be formed on a portion of the display 610. The processor (e.g., the processor 540 of FIG. 5) may generate a user interface 671 by using screen resource information and display the user interface together with an application screen 661.

As shown in FIG. 6A, the user interface 671 may contain an image in the form of a login button, and may be displayed to overlap with at least a part of the fingerprint sensing region 621. When the user touches the finger to the user interface 671, the fingerprint sensor can acquire a user's fingerprint. An application can determine the authenticity of the user by comparing the acquired fingerprint with previously stored fingerprint information, and thereby perform a login process. That is, the displayed user interface 671 can perform a function of guiding the user to touch the finger to the fingerprint sensing region of the display 610.

As shown in FIG. 6B, the size, location, and the like of the fingerprint sensor may be varied. Compared with that of FIG. 6A, a fingerprint sensing region 622 of FIG. 6B has a greater size and is changed in location. The processor may use appropriate screen resource information based on attributes such as size, location, type, and density of the fingerprint sensor of the electronic device 600. For example, in an embodiment of FIG. 6B, the fingerprint sensing region 622 has a greater size than in an embodiment of FIG. 6A, so that a user interface 672 may be generated using a greater sized login button image.

According to various embodiments, the screen resource information may be implemented in various forms such as an animation, a layout, or a menu, as well as an image. As shown in FIG. 6C, a user interface 673 may include an animation of moving a login button downward. Based on the attributes of the application, the processor may acquire the screen resource information to be used for constructing the user interface.

FIGS. 6A to 6C illustrate some examples 671, 672, and 673 of the user interface, and various embodiments of the disclosure are not limited thereto. For example, the processor may implement the user interface that contains, in addition to the login button, various components such as layouts, images, animations, checkboxes, widgets, lists, pop-ups, and indicators.

FIGS. 7 to 12 are diagrams illustrating system architecture of an electronic device according to various embodiments. Hereinafter, the description will be focused on configurations related to a fingerprint sensor among software modules on the system architecture of the electronic device.

Figure 7:
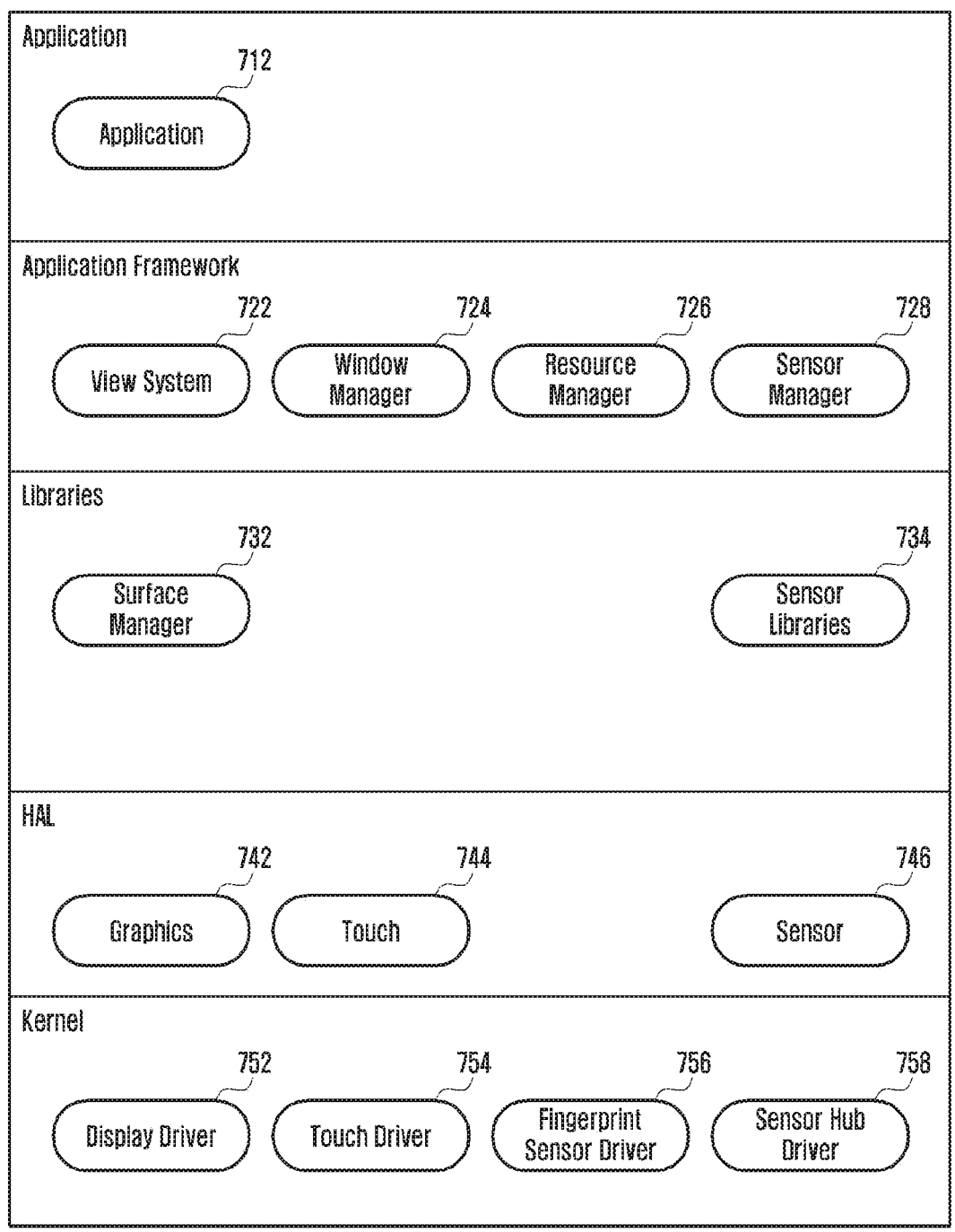
FIGS. 7 to 12 are diagrams illustrating system architecture of an electronic device according to various embodiments.

The electronic device stores software modules of various layers. As shown in FIG. 7, at least one application 712 is stored in an application layer. A view system 722, a window manager 724, a resource manager 726, and a sensor manager 728 are defined on an application framework, and a surface manager 732 and sensor libraries 734 may be included. A graphic 742, a touch 744, and a sensor 746 are implemented in a hardware abstract layer (HAL). A display driver 752, a touch driver 754, a fingerprint sensor driver 756, and a sensor hub driver 758 may be operated in a kernel.

In FIG. 7, software module associated with a function of the fingerprint sensor are the sensor manager 728 of the framework layer, the sensor libraries 734 of the library layer, the abstract fingerprint sensor 746 of the HAL layer, and the fingerprint sensor driver 756 of the kernel layer. As modules of a hardware layer not shown in FIG. 7, a fingerprint sensor and a sensor hub may be implemented in the electronic device. Hereinafter, a flow of information for generating a user interface associated with a fingerprint recognition function on the system architecture of the electronic device will be described in detail with reference to FIGS. 8 to 12.

Figure 8:
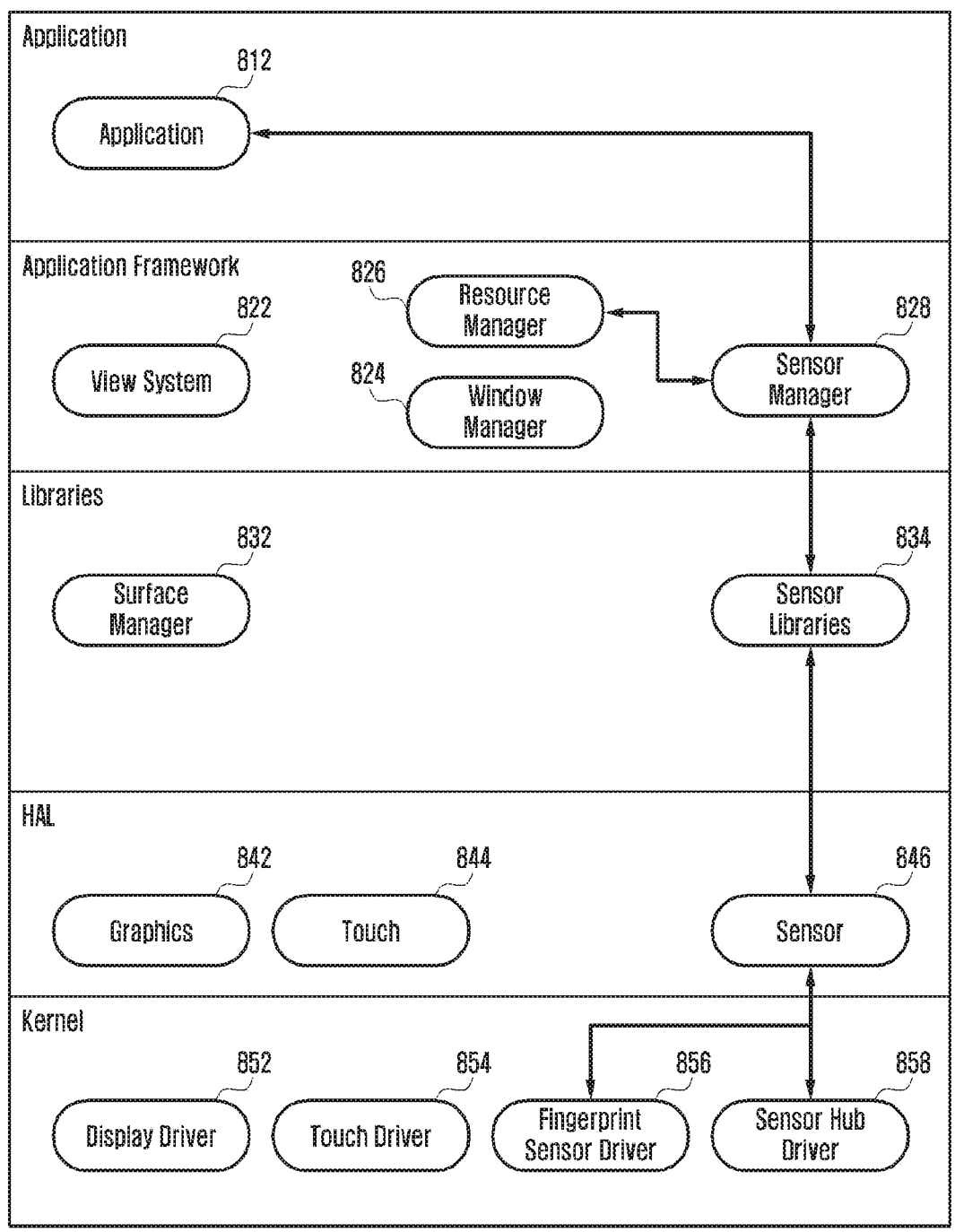

FIG. 8 shows a hierarchical flow of attribute information (e.g., type, location, size, density, etc.) of the fingerprint sensor. In FIG. 8, a module of a higher layer may perform an operation of a functional unit suitable for the layer by using a setting value of the module or a setting value of a module of a lower layer. Herein, the setting value may include a setting value of the electronic device in association with the fingerprint recognition function such as information associated with the type, location, size, and density of the fingerprint sensor.

An upper layer module related to the fingerprint sensor can read, as a default value, a setting value of a lower layer module related to the fingerprint sensor. A module can provide its own value or function to a same layer module or an upper layer module in the form of an application programming interface (API). The upper layer module related to the fingerprint sensor may designate a setting value other than the default value according to a function to be performed. Other modules existing in the same layer as or in an upper layer than the module related to the fingerprint sensor can read, write, delete, or modify the setting value of the module according to the authority set in the corresponding module.

For example, the setting values of the fingerprint sensor driver 856 and the sensor hub driver 858 in the kernel layer may be provided to the application 812 in the uppermost layer through the sensor 846 in the HAL layer, the sensor libraries 834 in the library layer, and the sensor manager 828 in the framework layer. The resource manager 826 may acquire the setting values of lower layers from the sensor manager 828.

Figure 9:
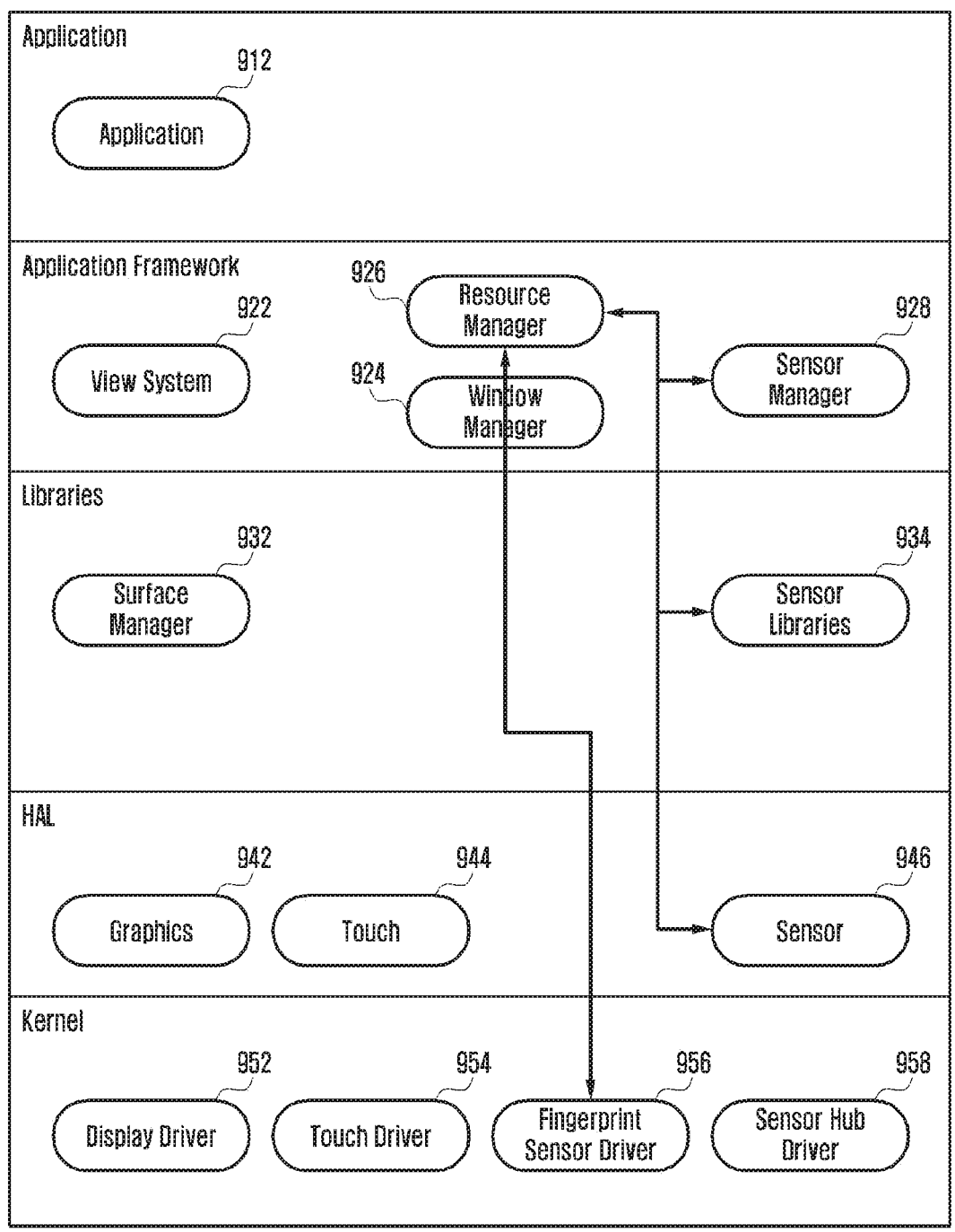

FIG. 9 shows an information flow of respective software modules related to resource management of a user interface associated with a fingerprint recognition function.

In order to select a resource (e.g., screen resource information) suitable for configuration of the fingerprint sensor implemented in the electronic device, a resource manager 926 may acquire setting values of information related to the type, location, size, density, and the like of the fingerprint sensor through various paths. The resource manager 926 can acquire setting values by accessing at least one of the sensor manager 928, the sensor libraries 934, the sensor 946, and the fingerprint sensor driver 956, which are modules of the same or lower layer. According to an embodiment, an accessible module may be determined according to the right of the resource manager 926.

According to various embodiments, the electronic device may manage resources (e.g., images, animations, menus, layouts, etc.) constituting the user interface through a resource directory. For example, a resource to be used in an electronic device having no fingerprint sensor may be included in a basic path (e.g., res/layout in case of a layout) to which no option is added. Also, a resource to be displayed in consideration of configuration of the fingerprint sensor in the electronic device may be included in a path (e.g., res/layout-fp in case of a layout) to which an option corresponding to the fingerprint sensor is added.

Table 1 below shows examples of paths which are set by attaching "-fp" as a qualifier after a directory name for each resource type so that the electronic including the fingerprint sensor can use them.

TABLE 1

| Resource type | Directory | File type | Description |
| --- | --- | --- | --- |
| Animation | res/animation-fp | XML, etc. | Use animation resources of a corresponding directory when an electronic device includes a fingerprint sensor |
| Images/ drawables | res/drawables-fp | Bitmap, 9-patch, XML, etc. | Use image resources of a corresponding directory when an electronic device includes a fingerprint sensor |
| Menu | res/menu-fp | XML, etc. | Use menu resources of a corresponding directory when an electronic device includes a fingerprint sensor |
| Layout | res/layout-fp | XML, etc. | Use layout resources of a corresponding directory when an electronic device includes a fingerprint sensor |

In addition, according to various embodiments, the electronic device may add a qualifier after a directory name for each fingerprint sensor type by assigning the qualifier corresponding to information (e.g., type, location, size, density) of the fingerprint sensor. Table 2 below is an example of a table that defines qualifiers corresponding to information of the fingerprint sensor.

TABLE 2

| Qualifier type | Qualifier value | Description |
| --- | --- | --- |
| Type of fingerprint sensor | Ex.: opt cap uls | Further qualify the type of a fingerprint sensor by using the following qualifiers opt: optical type fingerprint sensor cap: capacitive type fingerprint sensor uls: ultrasonic type fingerprint sensor |
| Location of fingerprint sensor | Ex.: loc-front loc-rear loc-left loc-right loc-top loc-bottom loc-home loc-menu | Further qualify the location of a fingerprint sensor by using the following qualifiers (Each of top, bottom, left and right may be predefined as specific coordinate values) loc-front: located on a front display (when there are displays on both sides of an electronic device) loc-rear: located on a rear display (when there are displays on both sides of an |

TABLE 2-continued

| Qualifier type | Qualifier value | Description |
| --- | --- | --- |
| | loc-camera | electronic device)<br>loc-left: located at left of a display<br>loc-right: located at right of a display<br>loc-top: located at top of a display<br>loc-bottom: located at bottom of a display<br>loc-home: located in a region corresponding to a home key<br>loc-menu: located in a region corresponding to a menu key<br>loc-camera: located in a region corresponding to a camera |
| Useable size of fingerprint sensor | Ex.:<br>Useable max width<br>fpw<N>dp<br>fpw<80>dp<br>Useable min width<br>fpsw<40>dp | Further qualify the useable maximum width of a fingerprint sensor by using the following qualifiers<br>p fpw<N>dp (dp: density-independent pixels): When a display width of a resource corresponding to a fingerprint sensor does not exceed N (value) dp<br>p fpsw<N>dp: When a display width of a resource corresponding to a fingerprint sensor is restricted more than N (value) dp |
| Size of fingerprint sensor | Ex.:<br>small<br>medium<br>large<br>full | Further qualify the size of a fingerprint sensor by using the following qualifiers<br>(The degree of small, medium and large may be predefined as specific values of width/height of a fingerprint sensor)<br>small: a small size of fingerprint sensor<br>medium: a medium size of fingerprint sensor<br>large: a large size of fingerprint sensor<br>full: a size of fingerprint sensor corresponding to a full screen |
| Density of fingerprint sensor | Ex.:<br>fp-ldpi<br>fp-mdpi<br>fp-hdpi<br>fp-xdpi | Further qualify the density (dpi: dots per inch) of a fingerprint sensor by using the following qualifiers<br>(The degree of density may be predefined as specific values based on the number of sensing unit pixels in width/height of a fingerprint sensor)<br>fp-ldpi: a low density of sensing pixels<br>fp-mdpi: a medium density of sensing pixels<br>fp-hdpi: a high density of sensing pixels<br>fp-xdpi small: an ultra-high density of sensing pixels |

According to various embodiments, the processor (or a resource manager 926) may acquire screen resource information corresponding to the attributes of the fingerprint sensor, based on the above qualifier. For example, the processor may find a directory containing qualifiers corresponding to the type, location, size, and density of the fingerprint sensor equipped in the electronic device and may obtain appropriate screen resource information within the directory.

As described above, the electronic device can include various types of the fingerprint sensor, and it is therefore required to display specific resources depending on the type of the fingerprint sensor which is actually equipped in the electronic device. For example, the optical fingerprint sensor may use the light source of the display as the light source of the fingerprint sensor, so that the shape, color, brightness, etc. of the resource displayed on the display may affect the fingerprint image acquisition.

As shown in Table 2, the screen resource information may be stored in different directories according to the types of the fingerprint sensor. For example, a normal image resource may be stored in "res/drawable", an image resource for the optical fingerprint sensor may be stored in "res/drawable-fp-opt", and an image resource for the capacitive fingerprint sensor may be stored in "res/drawable-fp-cap".

When it is determined that the electronic device includes an optical fingerprint sensor, the processor may load resources for the optical fingerprint sensor instead of resources for a capacitive or ultrasonic fingerprint sensor. For example, when it is determined that the electronic device includes the optical fingerprint sensor, the processor may exclude a resource storage path that does not include a qualifier "-pf" corresponding to the fingerprint sensor and a qualifier "-opt" corresponding to an optical type of the fingerprint sensor. Then, the processor may load a resource included in at least one path among the remaining paths to use the resource for constructing a user interface.

In addition, when the electronic device includes the fingerprint sensor, there may be various locations where the fingerprint sensor is disposed. The processor may identify the location of the fingerprint sensor from setting values of the electronic device and select a resource suitable for the identified location of the fingerprint sensor from among various kinds of screen resource information.

In addition, the fingerprint sensor equipped in the electronic device may have various sizes. The processor may identify the size of the fingerprint sensor from setting values of the electronic device and select a resource suitable for the identified size of the fingerprint sensor from among various kinds of screen resource information.

In addition, the fingerprint sensor equipped in the electronic device may have various densities. The processor may identify the density of the fingerprint sensor from setting values of the electronic device and select a resource suitable for the identified density of the fingerprint sensor from among various kinds of screen resource information.

The resource manager 926 of the framework may detect the current configuration of the electronic device and load appropriate resources for an application 912 being executed. At this time, it is possible to determine a qualifier value related to the current configuration of the electronic device among qualifier values as discussed above and then load a resource from a directory containing the determined qualifier value.

The resources stored in the framework and provided in a development environment may be provided in the form of an API and may be called and used when needed by the application 912. The resources of the individual application 912 may be contained in a package when building/packaging the application 912 and then provided as a part of the application 912. Also, when the application 912 is executed in the electronic device, the resources of the application 912 may be used for generating a user interface of the application 912.

Figure 10:
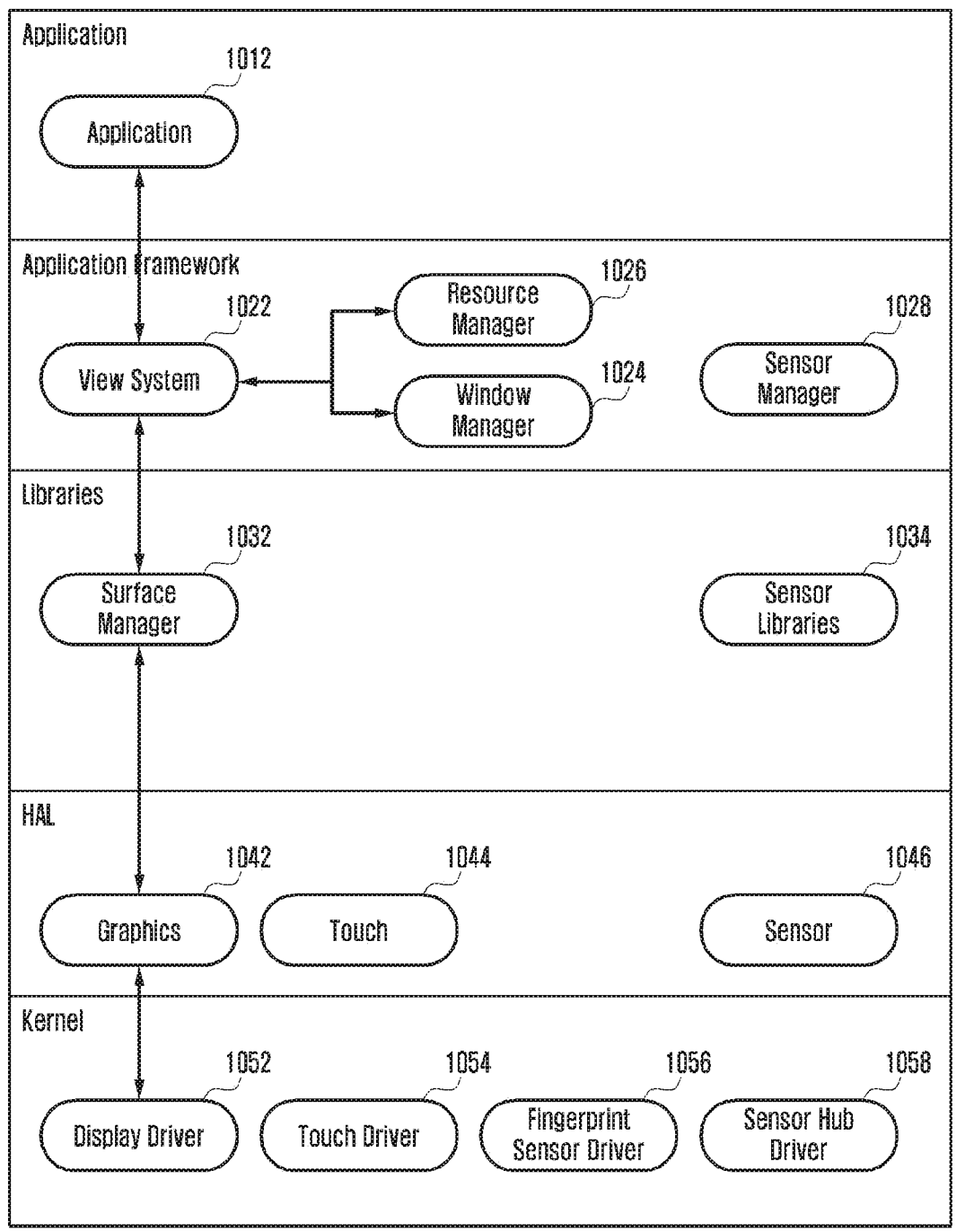

FIG. 10 illustrates an operation of drawing a user interface of a normal application through a display.

A view system 1022 of the framework layer may acquire information for constructing the user interface at the request of an application 1012. The view system 1022 may determine a window set for containing the user interface through a window manager 1024 and determine resources to be drawn on the window through a resource manager 1026.

The view system 1022 may construct the user interface on the determined window by using the provided resources. Then, the constructed user interface is displayed on a display by using lower modules (e.g., a surface manager 1032, a graphic 1042, and a display driver 1052).

Figure 11:
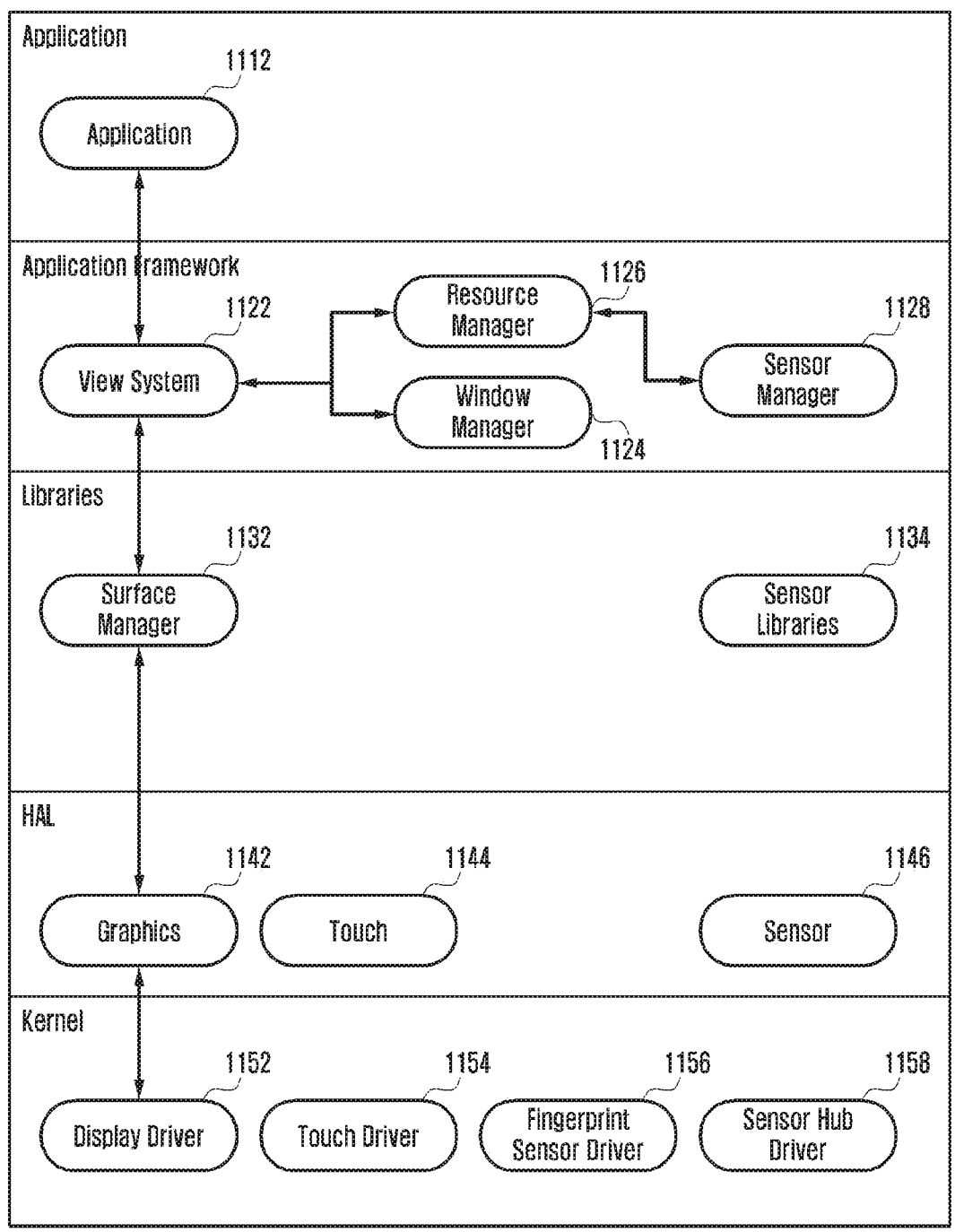

FIG. 11 illustrates an operation of constructing a user interface by applying the configuration of a fingerprint sensor of an electronic device in a framework.

According to various embodiments, the electronic device may determine whether to use a user interface provided by a processor as a user interface associated with the fingerprint sensor. That is, the electronic device may determine whether to construct the user interface in the processor (or framework) or in an application 1112, depending on the attributes of the application 1112 or of the electronic device. An embodiment of constructing the user interface in the processor (or framework) is shown in FIG. 11.

The view system 1122 of the framework layer may determine resources to be drawn on a window through a resource manager 1126. For this, the resource manager 1126 may acquire attribute information of the fingerprint sensor from a module (e.g., a sensor manager 1128) having the attribute information of the fingerprint sensor of the electronic device.

The resource manager 1126 may determine suitable resources by applying the attribute information of the fingerprint sensor, and also select a suitable resource by referring to qualifiers of storage paths of the resources. According to an embodiment, the application 1112 may store resources corresponding to various configurations of the fingerprint sensor at appropriate locations by referring to a resource management rule (e.g., a folder, a qualifier) provided by the framework, and the resource manager 1126 may determine a resource to be displayed by referring to the resources provided by the application 1112.

The user interface 1126 generated in the view system 1122 may be provided to a surface manager 1132, a graphic 1142 of the HAL layer, and a display driver 1152 of the kernel layer, and then displayed on a display.

Figure 12:
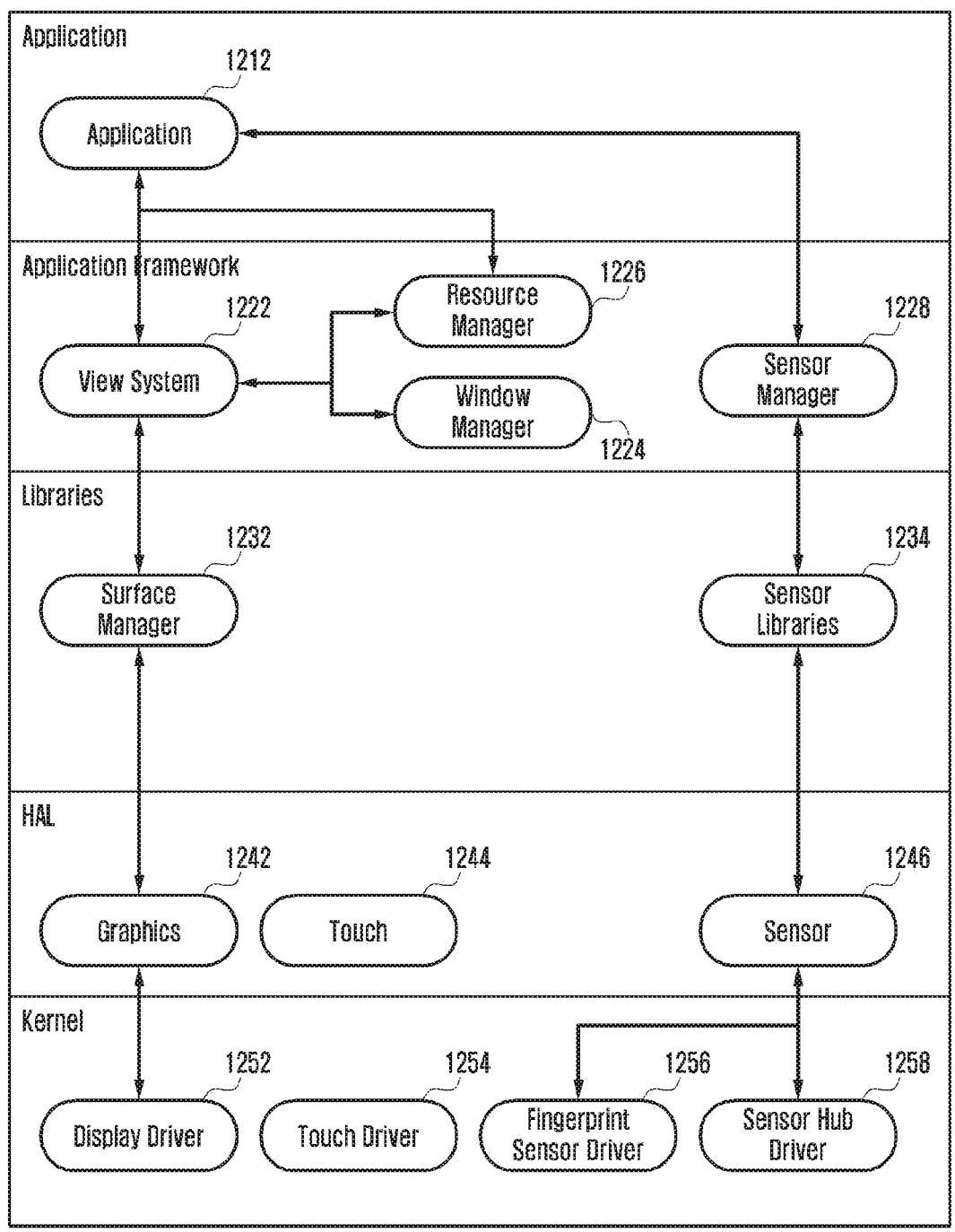

FIG. 12 illustrates an operation of constructing a user interface by applying the configuration of a fingerprint sensor of an electronic device in an application, unlike FIG. 11. This embodiment may be utilized when a resource manager 1226 does not support the resource selection considering setting values of the fingerprint sensor at the framework level or when external resources of an application 1212 are used.

According to an embodiment, the application 1212 may acquire information (e.g., type, location, size, density, etc.) of the fingerprint sensor equipped in the electronic device from a sensor manager 1228, sensor libraries 1234, and the like, and thereby select resources to be used for constructing the user interface. The application 1212 may construct the user interface by using directly selected resources, so that the generated user interface may be provided to a surface manager 1232, a graphic 1242 of the HAL layer, and a display driver 1252 of the kernel layer, and displayed on the display.

Figure 13A:
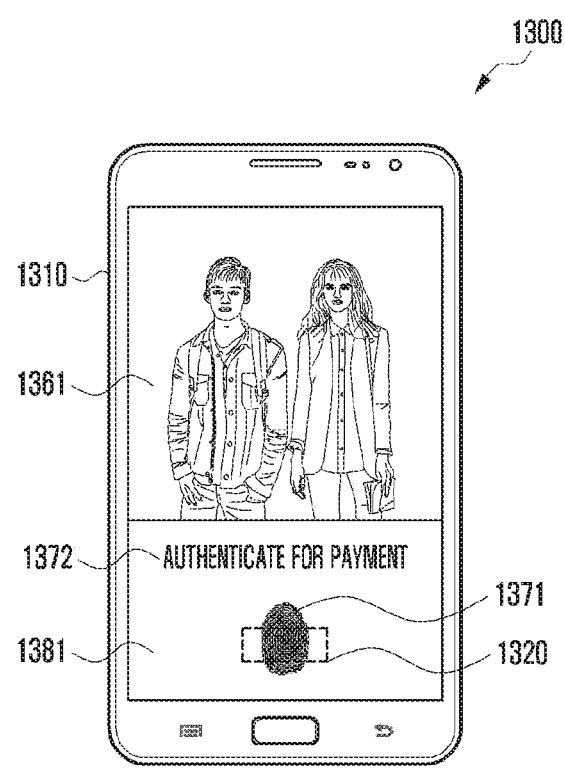
FIGS. 13A and 13B are diagrams illustrating examples of an application and a user interface simultaneously displayed according to various embodiments.
Figure 13B:
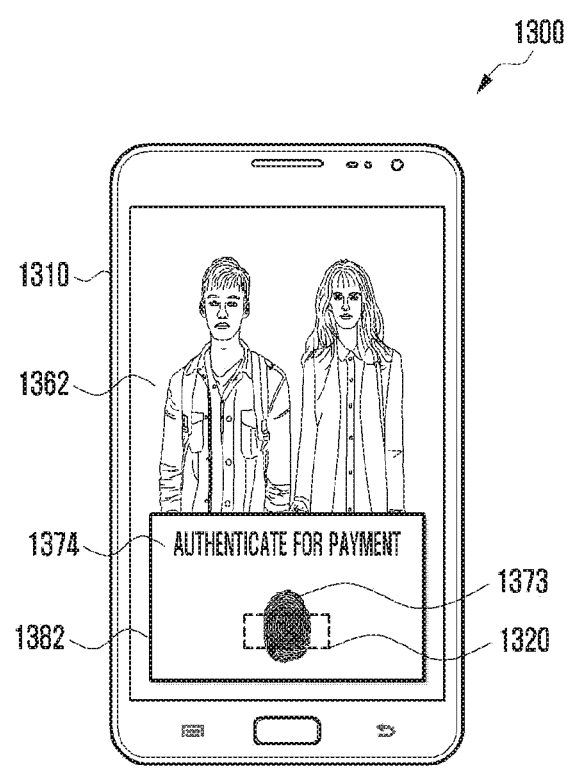

FIGS. 13A and 13B are diagrams illustrating examples of an application and a user interface simultaneously displayed according to various embodiments.

According to various embodiments, a processor (e.g., the processor 540 of FIG. 5) may be configured to display a screen separated into a first area 1381 associated with a user interface and a second area 1361 associated with an application. As shown in FIG. 13A, an application screen may be displayed in the first area 1361 at an upper portion of the display 1310, and the user interface associated with a fingerprint sensor function and generated by the processor (or application) may be displayed in the second area 1381 separated from the first area 1361 at a lower portion of the display. In this case, the application screen previously displayed on the entire display may be resized to the first area 1361, or a part thereof may be removed so that only a portion corresponding to the first area may be displayed.

According to various embodiments, the second area 1381 may include a fingerprint sensing region 1320 under which the fingerprint sensor is located. The user interface displayed in the second area 1381 may include an image 1371 and text information 1372 which offer a guide function for fingerprint acquisition to the user.

When the fingerprint acquisition is completed and the user interface function is terminated, the processor may remove the displayed user interface from the second area 1381 and display the application screen in the entire area of the display.

According to another embodiments, the processor may be configured to generate a first layer 1362 associated with the application and a second layer 1382 associated with the user interface and to display the first and second layers to overlap with each other at least in part. As shown in FIG. 13B, when an application screen is generated as the first layer 1362 and displayed on the entire display, and when it is required to provide the user interface associated with a fingerprint recognition function, the processor may construct the user interface with the second layer 1382 separated from the first layer 1362. As shown, the second layer 1382 associated with the user interface may be displayed in the foreground than the first layer 1362 in a pop-up form, and when the fingerprint acquisition is completed and the user interface function is terminated, the processor may remove the second layer 1382 displayed in the pop-up form.

FIGS. 14 to 20 are diagrams illustrating examples of customizing a user interface through an SDK of an application according to various embodiments.

According to various embodiments, the application may be a certain application produced by a third party other than the manufacturer of the electronic device, and may include a software development kit (SDK) that contains a header, a library, and other tools necessary for generating a user interface associated with the fingerprint recognition function. In addition, resources of an individual application may be contained in a package when building/packaging the application and then provided as a part of the application. Also, when the application is executed in the electronic device, the resources of the application may be used for generating a user interface of the application. Therefore, a developer of the application or a user of the electronic device can customize the user interface to fit the electronic device by inputting/deleting/modifying some pieces of information in the SDK.

Figure 14:
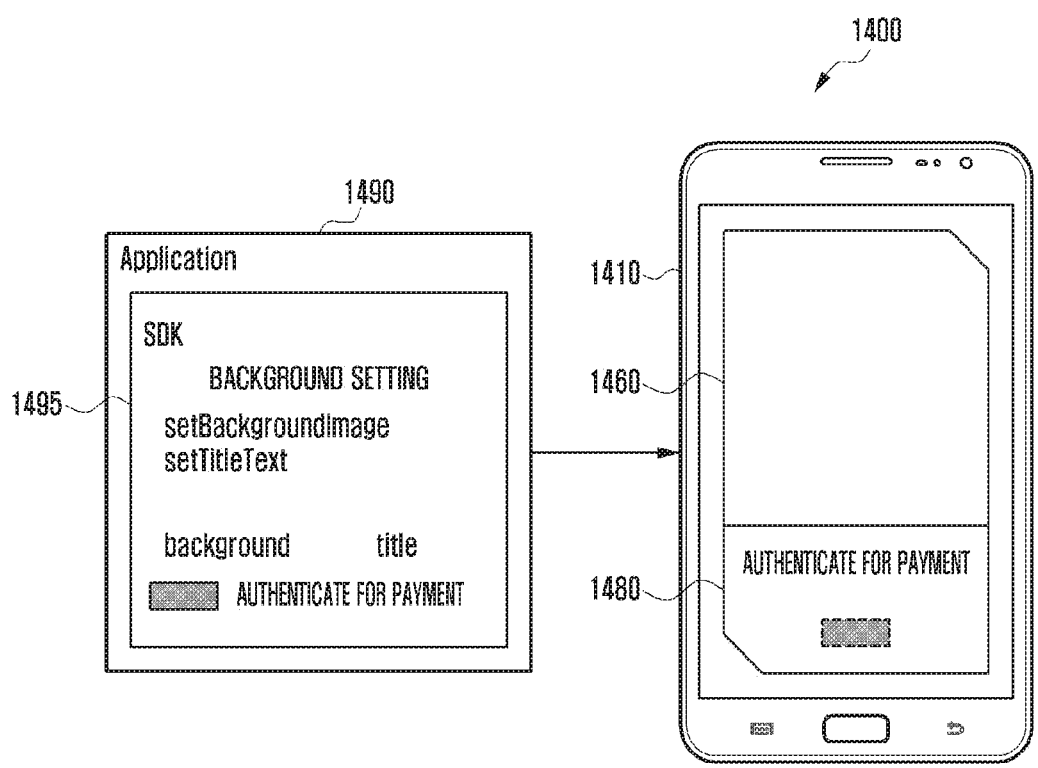
FIGS. 14 to 20 are diagrams illustrating examples of customizing a user interface through an SDK of an application according to various embodiments.

As shown in FIG. 14, the SDK 1495 of the application 1490 may provide a function of inputting a background image and various kinds of text information to be displayed on the background image. As shown, the processor may generate and display the user interface by using the background image and the text information (title—authenticate for payment) which are set on the SDK 1495.

Figure 15:
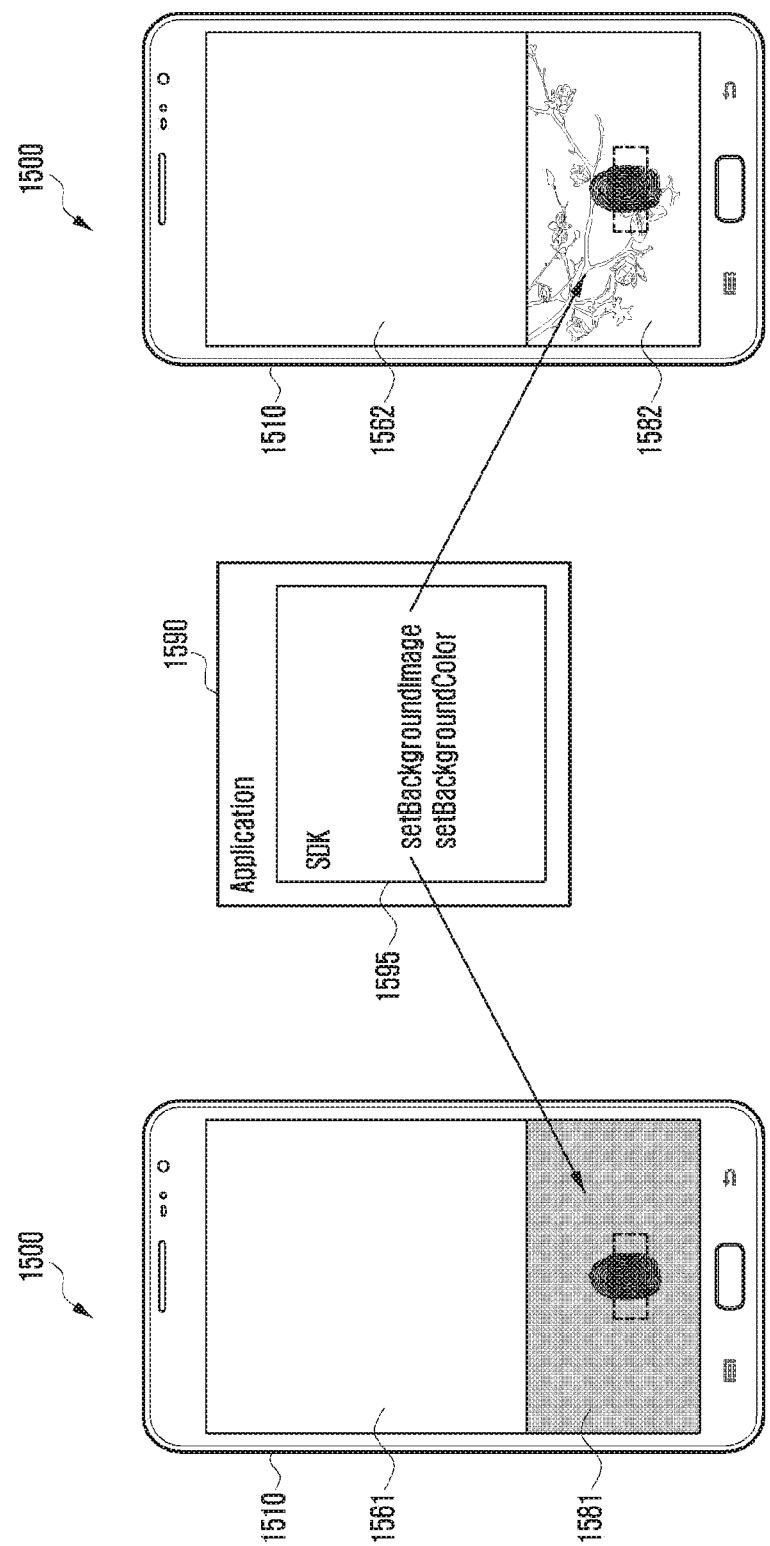

According to an embodiment, a background may be set in an application. When the user interface associated with the fingerprint sensor is split from the application screen, the SDK may enable the application to set a specified background color or image. The processor may construct the user interface by referring to the SDK of the application and using the background color and image provided by the application. A left example shown in FIG. 15 shows a user interface 1581 constructed using a background color which is set by the application in accordance with "setBackgroundcolor" defined in an SDK 1595, and a right example in FIG. 15 shows a user interface 1582 constructed using a background image which is set by the application in accordance with "setBackgroundImage" defined in the SDK 1595.

Figure 16:
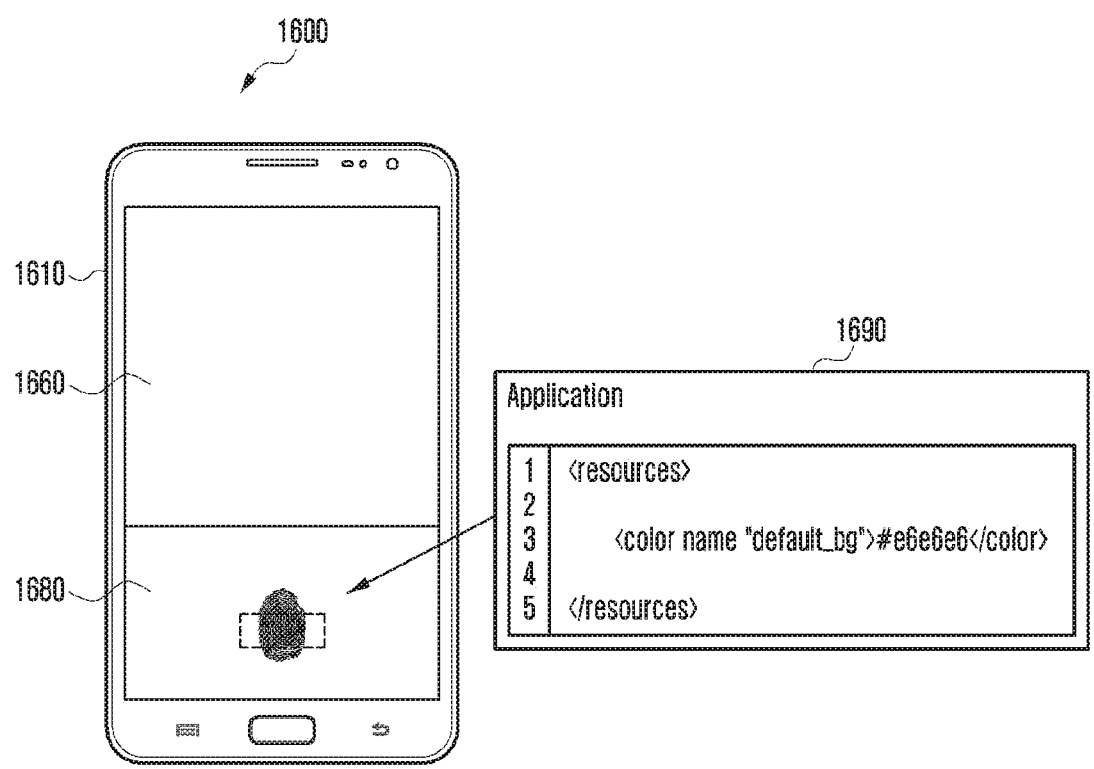

According to an embodiment, when no background color or image is designated in the application, the processor may extract the color of an application theme or background or the color most frequently displayed on an application screen, and set the extracted color as a background color of a region associated with the fingerprint sensor. For example, when the background color of the application is set as gray, the processor may determine the background color of the user interface to be equally gray. Referring to FIG. 16, a user interface 1680 displayed separately from the application screen may have the same background color as the background color of the application screen 1660.

Figure 17:
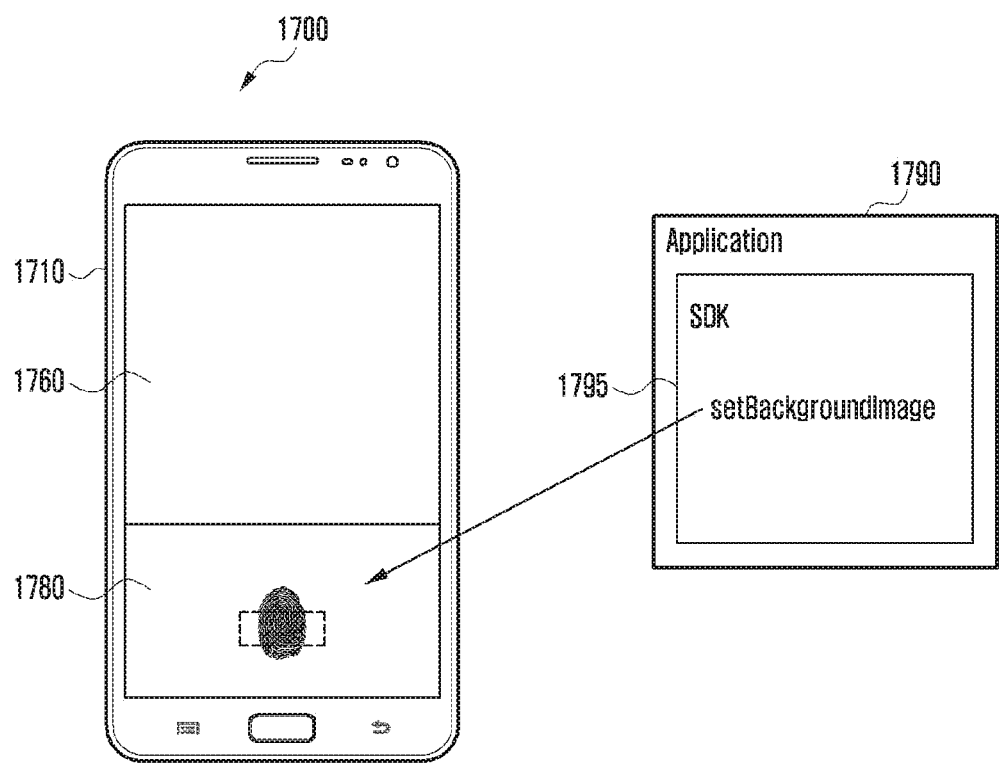

According to an embodiment, the SDK may have a function of providing a fingerprint icon for acquiring a user's fingerprint in an application. As shown in FIG. 17, a user interface 1780 may be constructed using the fingerprint icon registered in the application in accordance with "setfingerprintImage" defined in the SDK 1795. When the fingerprint icon is acquired from the application, the processor may resize the fingerprint icon according to the size of a fingerprint sensing region of the display.

Figure 18:
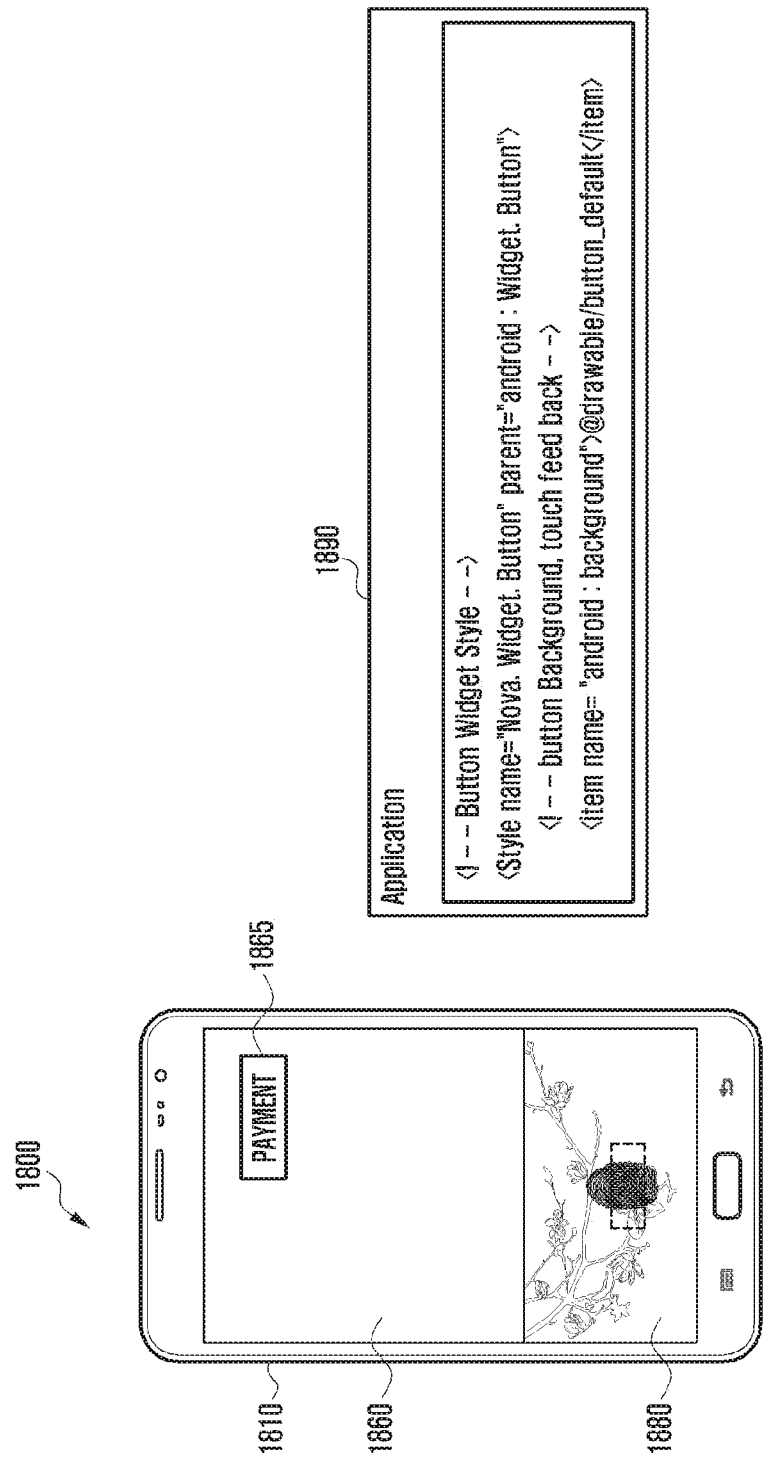

According to an embodiment, when the application does not provide a fingerprint icon, the processor may provide a default image. Also, in order to provide consistency with the application screen, the processor may identify a color of an object (e.g., a payment button) associated with the fingerprint recognition function in the application screen and change the color of the default image by using the identified color. Therefore, as shown in FIG. 18, the color of the default image (or fingerprint icon) 1880 may be displayed to be equal (or similar) to the color of the payment button 1865.

Figure 19:
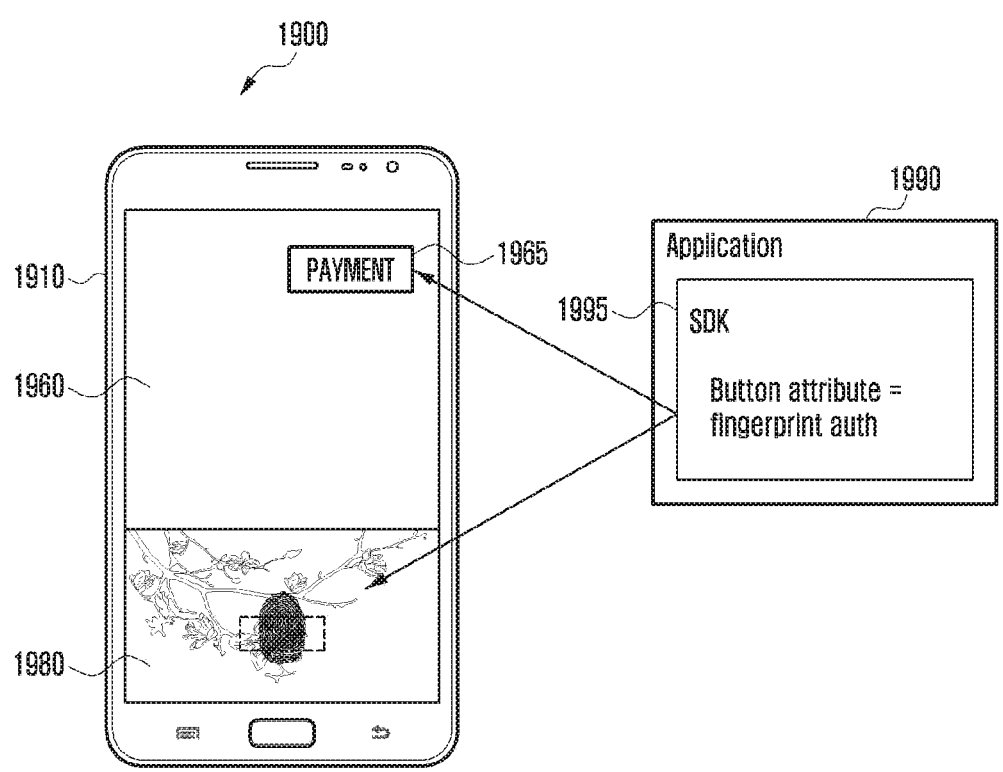

According to an embodiment, an application may have an object (e.g. a payment button) to be linked with fingerprint authentication and assign a specific attribute to the object (e.g., attribute=fingerprint auth). In this case, label information of the object may be acquired from the user interface associated with the fingerprint recognition function. When the fingerprint recognition is successful in the user interface, a button click event is delivered to the application at the same time so that an input with respect to the object can be processed together with a fingerprint recognition operation. As shown in FIG. 19, by setting "Button_attribute=fingerprint auth" in an SDK 1995 of an application 1990, the attribute of a payment button 1965 of an application screen 1960 may be set to depended on a fingerprint recognition operation. According to an embodiment, the payment button 1965 may be displayed in a disabled state, and the occurrence of an event by a user's touch input may be ignored.

Figure 20:
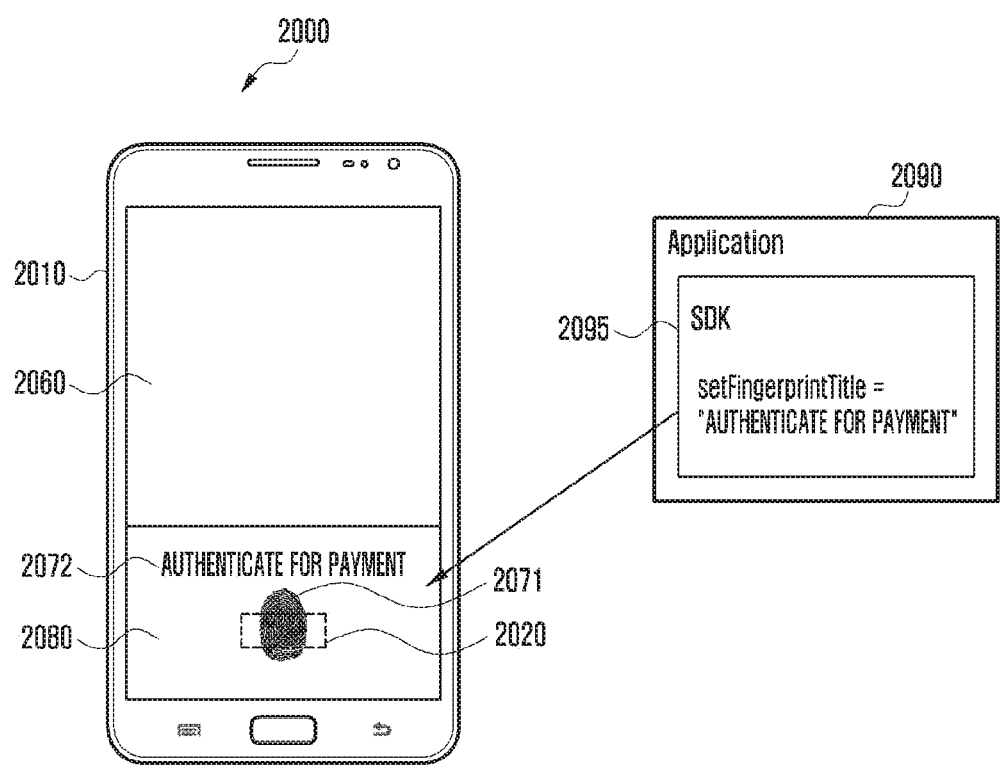

According to an embodiment, an application 2090 may include an SDK 2095 for setting text for fingerprint acquisition around a fingerprint icon. As shown in FIG. 20, when a specific text (authenticate for payment) is written on the SDK 2095, a user interface may display the text 2072 around the fingerprint icon 2071.

According to an embodiment, when the application does not provide the fingerprint icon, the processor may set a title as default. Also, in order to provide consistency with the application, the processor may receive a color of a title attribute of the application and change the default color of the title.

An electronic device according to various embodiments may include a fingerprint sensor, a display, and a processor. The processor may be configured to execute an application including a plurality of resources corresponding to a plurality of images to be displayed through the display in association with the fingerprint sensor, to determine a resource corresponding to the fingerprint sensor among the plurality of resources, based on an attribute of the fingerprint sensor, and to display an image corresponding to the determined resource though the display in association with the fingerprint sensor.

According to various embodiments, the display may be configured to include a display region in which a fingerprint sensing region is formed.

According to various embodiments, the plurality of resources may include a first resource and a second resource, and the processor may be configured to select the first resource when the fingerprint sensor has a first attribute, and to select the second resource when the fingerprint sensor has a second attribute.

According to various embodiments, the processor may be configured to check a type of the fingerprint sensor, to select the first resource when the type of the fingerprint sensor has a first attribute, and to select the second resource when the type of the fingerprint sensor has a second attribute.

According to various embodiments, the processor may be configured to check a size or density of the fingerprint sensor, to select the first resource when the size or density of the fingerprint sensor has a first attribute, and to select the second resource when the size or density of the fingerprint sensor has a second attribute.

An electronic device according to various embodiments may include a fingerprint sensor, a display, and a processor. The processor may be configured to execute an application, to acquire screen resource information associated with the application, to generate a user interface associated with the fingerprint sensor, based on the screen resource information, and to display the user interface around the fingerprint sensor through the display.

According to various embodiments, the display may be configured to include a display region in which a fingerprint sensing region is formed.

According to various embodiments, the processor may be configured to display a screen separated into a first area associated with the user interface and a second area associated with the application.

According to various embodiments, the processor may be configured to generate a first layer associated with the application and a second layer associated with the user interface, and to display the first and second layers to overlap with each other at least in part.

According to various embodiments, the processor may be configured to display the user interface in a region designated in the application.

According to various embodiments, the processor may be configured to generate the user interface by using an image, an animation, a menu, or a layout provided as the screen resource information in the application.

According to various embodiments, the processor may be configured to generate the user interface, at least based on a background, a theme, or a title associated with the application.

Figure 21:
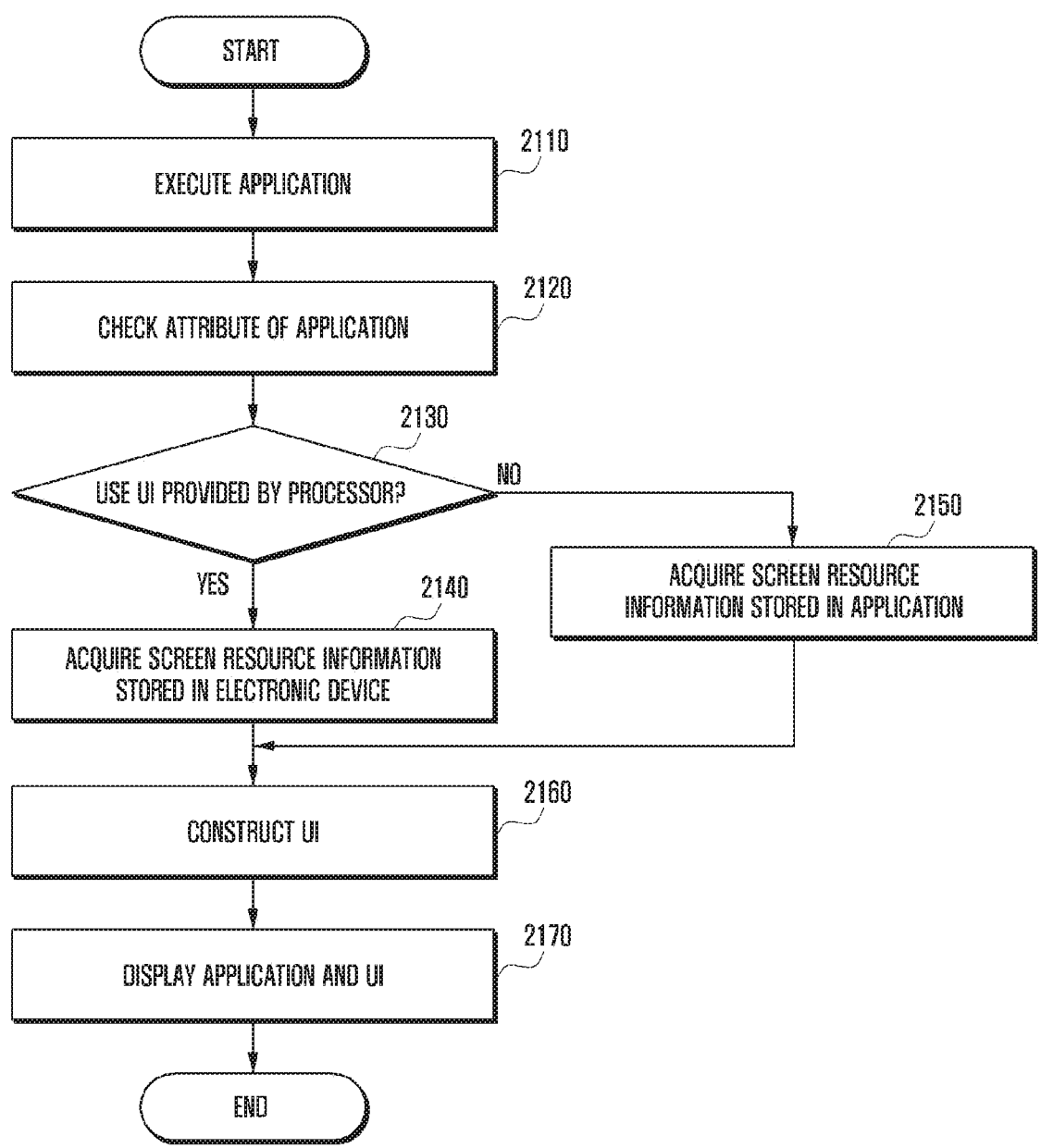
FIGS. 21 and 22 are diagrams illustrating a method for providing a screen of an electronic device according to various embodiments.

FIG. 21 is a diagram illustrating a method for providing a screen of an electronic device according to various embodiments.

The illustrated method may be performed by the electronic device described above with reference to FIGS. 1 to 20, and the technical features described above will be described repeatedly below.

At operation 2110, the electronic device may execute an application. Here, this application may have a fingerprint recognition function related to finance, security, personal contents, or the like, and may provide a user interface associated with a fingerprint recognition function.

At operation 2120, the electronic device may check the attribute of the executed application. According to various embodiments, the attribute of the application indicates a subject that generates a user interface associated with the fingerprint recognition function. That is, the attribute of the application may indicate whether the application is an application determined to use a user interface provided by the processor or an application capable of directly generating the user interface by using screen resource information associated with the fingerprint recognition function.

At operation 2130, the electronic device may determine, based on a result of the operation 2120, whether the application is an application determined to use the user interface provided by the processor in association with the fingerprint recognition function.

At operation 2140, the electronic device may acquire screen resource information stored therein. According to various embodiments, the processor of the electronic device may acquire screen resource information suitable for the attribute of the electronic device and the attribute of the application from screen resource information in a framework. According to various embodiments, the electronic device may store screen resource information in separate directories according to the type of screen resource information and the type, location, size, and density of a fingerprint sensor. Each directory may contain qualifiers for defining attributes of screen resource information belonging thereto. This is illustrated in Tables 1 and 2 above. Based on the qualifiers, the processor of the electronic device may acquire screen resource information corresponding to at least one of the type, location, size, and density of the fingerprint sensor.

At operation 2150, the electronic device may autonomously acquire screen resource information associated with the fingerprint recognition function at the application level.

At operation 2160, the electronic device may construct a user interface associated with the fingerprint recognition function by using the acquired screen resource information.

At operation 2170, the electronic device may display the application and the constructed user interface through a display. According to an embodiment, the processor may display an application screen generated by the application in a second area of the display and also display, in a split form, the user interface associated with the fingerprint recognition function and generated using the screen resource information by the processor in a first area separated from the second area. According to another embodiment, the processor may generate a first layer for the application screen generated by the application, and generate a second layer for the user interface associated with the fingerprint recognition function and generated using the screen resource information by the processor. Then, the processor may display the second layer in the foreground of the first layer in a pop-up form.

Figure 22:
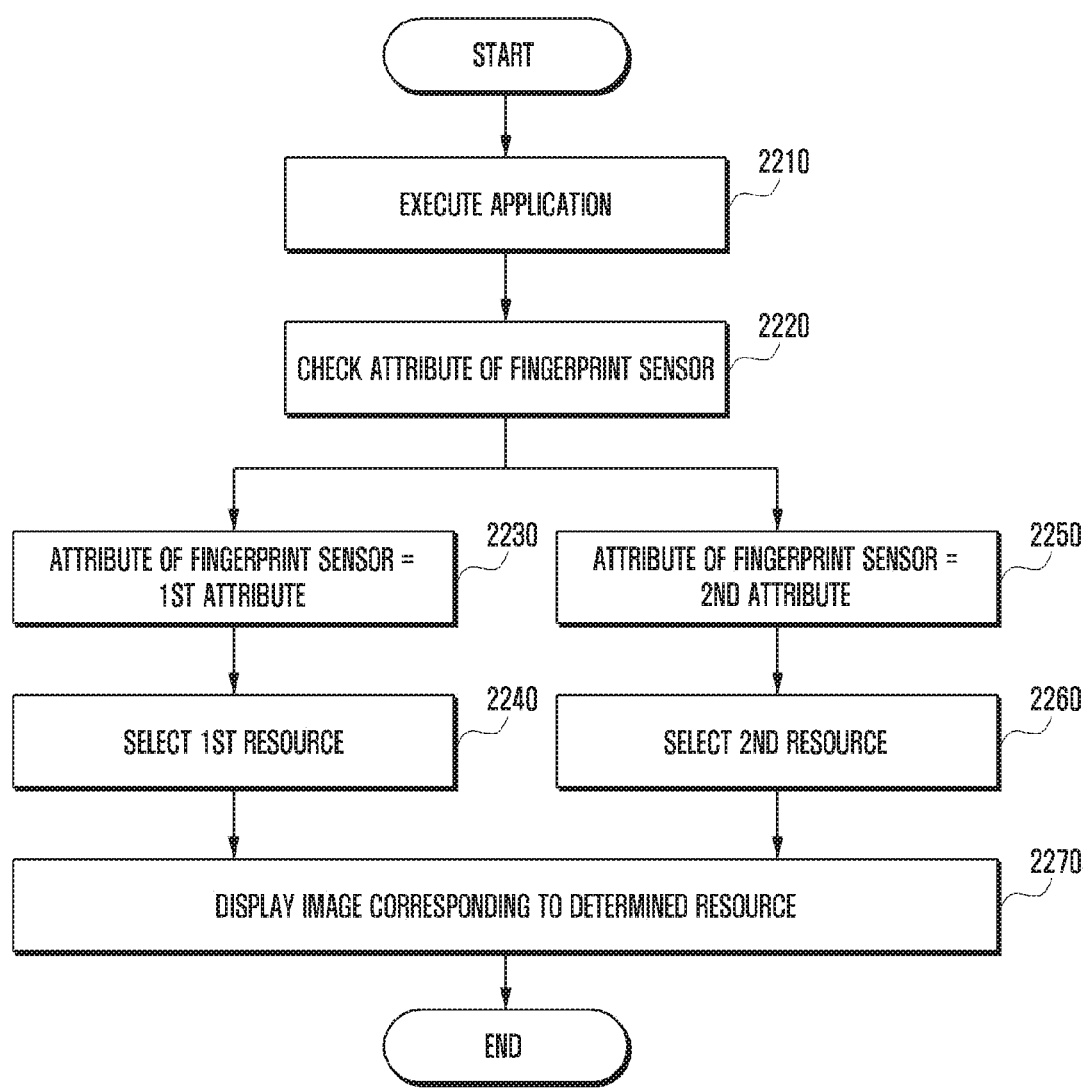

FIG. 22 is a diagram illustrating a method for providing a screen of an electronic device according to various embodiments.

The illustrated method may be performed by the electronic device described above with reference to FIGS. 1 to 20, and the technical features described above will be described repeatedly below.

At operation 2210, a processor (e.g., the processor 540 of FIG. 5) of the electronic device may execute an application. According to an embodiment, the application may contain a plurality of resources corresponding to a plurality of images to be displayed via a display in association with a fingerprint sensor (e.g., the fingerprint sensor 520 of FIG. 5) equipped in the electronic device.

At operation 2220, the processor may check the attribute of the fingerprint sensor. According to an embodiment, the attribute of the fingerprint sensor may include information about the type, location, size, or density of the fingerprint sensor.

When the attribute of the fingerprint sensor is a first attribute at operation 2230, the processor may select a first resource corresponding to the first attribute at operation 2240. Alternatively, when the attribute of the fingerprint sensor is a second attribute at operation 2250, the processor may select a second resource corresponding to the second attribute at operation 2260. For example, when the type of the fingerprint sensor has the first attribute (e.g., an optical fingerprint sensor), the processor may select the first resource (e.g., screen resource information suitable for using the optical fingerprint sensor), and when the type of the fingerprint sensor has the second attribute (e.g., a capacitive fingerprint sensor), the processor may select the second resource (e.g., screen resource information suitable for using the capacitive fingerprint sensor). In addition, when the size or density of the fingerprint sensor has the first attribute (e.g., a fingerprint sensing region of 2 by 1 centimeters), the processor may select the first resource (e.g., screen resource information of 2 by 1 centimeters), and when the size or density of the fingerprint sensor has the second attribute (e.g., a fingerprint sensing region of 3 by 1.5 centimeters), the processor may select the second resource (e.g., screen resource information of 3 by 1.5 centimeters).

At operation 2270, the processor may display an image corresponding to the determined resource through the display in association with the fingerprint sensor.

A method of an electronic device according to various embodiments may include, when the electronic device includes a touch sensor, a fingerprint sensor, and a display having a display region in which a fingerprint sensing region is formed, operations of executing an application including a plurality of resources corresponding to a plurality of images to be displayed through the display in association with the fingerprint sensor, determining a resource corresponding to the fingerprint sensor among the plurality of resources, based on an attribute of the fingerprint sensor, and displaying an image corresponding to the determined resource though the display in association with the fingerprint sensor.

According to various embodiments, the plurality of resources may include a first resource and a second resource, and the operation of determining a resource may include an operation of selecting the first resource when the fingerprint sensor has a first attribute, or selecting the second resource when the fingerprint sensor has a second attribute.

According to various embodiments, the operation of determining a resource may include operations of checking a type of the fingerprint sensor; and selecting the first resource when the type of the fingerprint sensor has a first attribute, or selecting the second resource when the type of the fingerprint sensor has a second attribute.

According to various embodiments, the operation of determining a resource may include operations of checking a size or density of the fingerprint sensor; and selecting the first resource when the size or density of the fingerprint sensor has a first attribute, or selecting the second resource when the size or density of the fingerprint sensor has a second attribute.

According to various embodiments, the operation of displaying an image corresponding to the determined resource may include an operation of displaying the executed application in a first area of the display and displaying the image corresponding to the determined resource in a second area separated from the first area.

According to various embodiments, the operation of displaying an image corresponding to the determined resource may include operations of generating a first layer associated with the executed application and a second layer containing the image corresponding to the determined resource; and displaying the first and second layers to overlap with each other at least in part.

According to various embodiments, the operation of displaying an image corresponding to the determined resource may include an operation of displaying the image corresponding to the resource in a region designated in the application.

According to various embodiments, the method may further include an operation of generating a user interface by using an image, an animation, a menu, or a layout provided as the resource in the application.

The invention claimed is:

1. An electronic device comprising:
a display;
a fingerprint sensor disposed under the display; and
a processor,
wherein the processor is configured to:
execute an application including a plurality of resources comprising a first resource corresponding to a first attribute and a second resource corresponding to a second attribute, wherein each of the plurality of resources is for configuring an image in association with a fingerprint sensor,
obtain an attribute of the fingerprint sensor disposed under the display,
select a resource from among the first resource and the second resource, corresponding to the obtained attribute of the fingerprint sensor,
generate an image in association with the fingerprint sensor disposed under the display using the selected resource, and
display the image on a fingerprint sensing region on the display, the fingerprint sensing region corresponding to the fingerprint sensor disposed under the display.

2. The electronic device of claim 1, wherein the processor is further configured to:
check a type of the fingerprint sensor disposed under the display,
select the first resource when the type of the fingerprint sensor has the first attribute, and
select the second resource when the type of the fingerprint sensor has the second attribute.

3. The electronic device of claim 1, wherein the processor is further configured to:
check a size or density of the fingerprint sensor disposed under the display,
select the first resource when the size or density of the fingerprint sensor has the first attribute, and
select the second resource when the size or density of the fingerprint sensor has the second attribute.

4. An electronic device comprising:
a display;
a fingerprint sensor disposed under the display; and
a processor,
wherein the processor is configured to:
execute an application including a plurality of resources,
obtain an attribute of the fingerprint sensor disposed under the display,
acquire screen resource information including at least one of the plurality of resources of the application corresponding to the obtained attribute of the fingerprint sensor disposed under the display;
generate a user interface associated with the fingerprint sensor, based on the acquired screen resource information, and
display the user interface around a fingerprint sensing region on the display, the fingerprint sensing region corresponding to the fingerprint sensor disposed under the display.

5. The electronic device of claim 4, wherein the processor is configured to display a screen separated into a first area associated with the user interface and a second area associated with the application.

6. The electronic device of claim 4, wherein the processor is configured to:
generate a first layer associated with the application and a second layer associated with the user interface, and
display the first and second layers to overlap with each other at least in part.

7. The electronic device of claim 4, wherein the processor is configured to display the user interface in a region designated in the application.

8. The electronic device of claim 4, wherein the processor is configured to generate the user interface by using the at least one resource including at least one of an image, an animation, a menu, or a layout provided as the screen resource information in the application.

9. The electronic device of claim 4, wherein the processor is configured to generate the user interface, at least based on a background, a theme, or a title associated with the application.

10. A method of an electronic device including a touch sensor, a fingerprint sensor, and a display having a display region in which a fingerprint sensing region is formed, the method comprising:
executing an application including a plurality of resources comprising a first resource corresponding to a first attribute and a second resource corresponding to a second attribute, wherein each of the plurality of resources is for configuring an image in association with a fingerprint sensor;
obtaining an attribute of the fingerprint sensor disposed under the display;
selecting a resource from among the first resource and the second resource, corresponding to the obtained attribute of the fingerprint sensor; and
generating an image in association with the fingerprint sensor disposed under the display using the selected resource; and
displaying the image on a fingerprint sensing region on the display, the fingerprint sensing region corresponding to the fingerprint sensor disposed under the display.

11. The method of claim 10, wherein the selecting a resource comprises:
checking a type of the fingerprint sensor disposed under the display; and
selecting the first resource when the type of the fingerprint sensor has the first attribute, or selecting the second resource when the type of the fingerprint sensor has the second attribute.

12. The method of claim 10, wherein the selecting a resource comprises:
checking a size or density of the fingerprint sensor disposed under the display; and selecting the first resource when the size or density of the fingerprint sensor has the first attribute, or selecting the second resource when the size or density of the fingerprint sensor has the second attribute.

13. The method of claim 10, wherein the displaying an image comprises displaying the executed application in a first area of the display and displaying the image corresponding to the determined resource in a second area separated from the first area.

14. The method of claim 10, wherein the displaying an image comprises:
   generating a first layer associated with the executed application and a second layer containing the image corresponding to the determined resource; and
   displaying the first and second layers to overlap with each other at least in part.

15. The method of claim 10, wherein the displaying an image comprises displaying the image corresponding to the selected resource in a region designated in the application.

16. The method of claim 10, further comprising:
   generating a user interface by using at least one of an image, an animation, a menu, or a layout provided as the resource in the application.

\* \* \* \* \*